United States Patent
Chen et al.

(10) Patent No.: US 11,158,304 B2
(45) Date of Patent: Oct. 26, 2021

(54) TRAINING METHOD OF SPEECH SIGNAL PROCESSING MODEL WITH SHARED LAYER, ELECTRONIC DEVICE AND STORAGE MEDIUM

(71) Applicant: Tencent Technology (Shenzhen) Company Limited, Shenzhen (CN)

(72) Inventors: Lianwu Chen, Shenzhen (CN); Meng Yu, Shenzhen (CN); Min Luo, Shenzhen (CN); Dan Su, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 179 days.

(21) Appl. No.: 16/655,548

(22) Filed: Oct. 17, 2019

(65) Prior Publication Data

US 2020/0051549 A1 Feb. 13, 2020

Related U.S. Application Data

(63) Continuation of application No. PCT/CN2018/115704, filed on Nov. 15, 2018.

(30) Foreign Application Priority Data

Nov. 24, 2017 (CN) .......................... 201711191604.9

(51) Int. Cl.
*G10L 15/16* (2006.01)
*G10L 15/06* (2013.01)
(Continued)

(52) U.S. Cl.
CPC .......... *G10L 15/063* (2013.01); *G06N 3/0445* (2013.01); *G06N 3/08* (2013.01);
(Continued)

(58) Field of Classification Search
CPC ........ G10L 15/16; G10L 15/063; G10L 25/30
See application file for complete search history.

(56) References Cited

U.S. PATENT DOCUMENTS

| 9,460,711 | B1* | 10/2016 | Vanhoucke | ........... G10L 15/063 |
| 2015/0161522 | A1* | 6/2015 | Saon | ..................... G06N 3/0454 |
| | | | | 706/12 |

(Continued)

FOREIGN PATENT DOCUMENTS

| CN | 104881678 A | 9/2015 |
| CN | 106355248 A | 1/2017 |

(Continued)

OTHER PUBLICATIONS

Zhang, Yue, et al. "Multi-task deep neural network with shared hidden layers: Breaking down the wall between emotion representations." 2017 IEEE international conference on acoustics, speech and signal processing (ICASSP). IEEE, Mar. 5, 2017. (Year: 2017).*

(Continued)

*Primary Examiner* — Jialong He
(74) *Attorney, Agent, or Firm* — Crowell & Moring LLP

(57) ABSTRACT

Embodiments of the present invention provide a speech signal processing model training method, an electronic device and a storage medium. The embodiments of the present invention determines a target training loss function based on a training loss function of each of one or more speech signal processing tasks; inputs a task input feature of each speech signal processing task into a starting multi-task neural network, and updates model parameters of a shared layer and each of one or more task layers of the starting multi-task neural network corresponding to the one or more speech signal processing tasks by minimizing the target training loss function as a training objective, until the
(Continued)

starting multi-task neural network converges, to obtain a speech signal processing model.

20 Claims, 10 Drawing Sheets

(51) Int. Cl.
   *G06N 3/04*     (2006.01)
   *G06N 3/08*     (2006.01)
   *G10L 15/183*   (2013.01)
   *G10L 15/22*    (2006.01)

(52) U.S. Cl.
   CPC ............ *G10L 15/16* (2013.01); *G10L 15/183* (2013.01); *G10L 15/22* (2013.01); *G10L 2015/0635* (2013.01)

(56) References Cited

U.S. PATENT DOCUMENTS

| | | | |
|---|---|---|---|
| 2018/0053087 A1* | 2/2018 | Fukuda | G06N 3/063 |
| 2018/0121787 A1* | 5/2018 | Hashimoto | G06F 40/253 |
| 2019/0034814 A1* | 1/2019 | Amer | G06N 5/04 |
| 2020/0380372 A1* | 12/2020 | Wierstra | G06N 3/086 |

FOREIGN PATENT DOCUMENTS

| | | |
|---|---|---|
| CN | 107357838 A | 11/2017 |
| CN | 109841220 A | 6/2019 |
| WO | WO 2017/083399 A2 | 5/2017 |

OTHER PUBLICATIONS

Georgiev, Petko, et al. "Low-resource multi-task audio sensing for mobile and embedded devices via shared deep neural network representations." Proceedings of the ACM on Interactive, Mobile, Wearable and Ubiquitous Technologies 1.3 (Sep. 2017): 1-19. (Year: 2017).*

Ruder, Sebastian. "An overview of multi-task learning in deep neural networks." arXiv preprint arXiv:1706.05098 (2017). (Year: 2017).*

Pironkov, Gueorgui, Stephane Dupont, and Thierry Dutoit. "Multi-task learning for speech recognition: an overview." ESANN. 2016. (Year: 2016).*

International Search Report and Written Opinion dated Dec. 29, 2018 for PCT Application No. PCT/CN2018/115704 (Chinese language only) (9 pp.).

Chen, Z. et al., "Speech enhancement and recognition using multi-task learning of long short-term memory recurrent neural networks", Mitsubishi Electric Research Laboratories, TR2015-100, Sep. 2015, 7 pages.

Chen, Z. et al., "GradNorm: Gradient Normalization for Adaptive Loss Balancing in Deep Multitask Networks", Proceedings of the 35$^{th}$ International Conference on Machine Learning, Stockholm, Sweden, PMLR 80, 2018, 10 pages.

Harutyunyan, Hrayr et al., "Multitask learning and benchmarking with clinical time series data", Scientific Data, Jun. 17, 2019, 18 pages.

Extended European Search Report on application No. 18880575.8, dated Dec. 10, 2020, 9 pages.

* cited by examiner

TRAINING METHOD OF SPEECH SIGNAL PROCESSING MODEL WITH SHARED LAYER, ELECTRONIC DEVICE AND STORAGE MEDIUM

RELATED APPLICATIONS

This application is a continuation application of and claims priority to PCT International Application No. PCT/CN2018/115704 entitled "SPEECH SIGNAL PROCESSING MODEL TRAINING METHOD, APPARATUS, ELECTRONIC DEVICE AND STORAGE MEDIUM" and filed with the China National Intellectual Property Administration on Nov. 15, 2018, which claims priority to Chinese Patent Application No. 201711191604.9, entitled "SPEECH SIGNAL PROCESSING MODEL TRAINING METHOD, APPARATUS, ELECTRONIC DEVICE AND STORAGE MEDIUM" filed with the China National Intellectual Property Administration on Nov. 24, 2017, which are incorporated by reference in their entireties.

FIELD OF THE TECHNOLOGY

Embodiments of the present invention relate to the field of speech processing technologies, and in particular, to a speech signal processing model training method, an electronic device and a storage medium for processing speech signal.

BACKGROUND OF THE DISCLOSURE

With the development of speech recognition technologies, the performance of the speech signal processing technology of terminals is particularly important for maintaining a high speech recognition rate in complex environments. Currently, a common speech recognition process is as follows: a terminal performs speech signal processing on an input multi-channel speech, outputs a single-channel speech, and then sends the single-channel speech to a speech backend server for speech recognition.

A conventional speech signal processing procedure generally includes a plurality of speech signal processing tasks. The plurality of speech signal processing tasks collaboratively process an input multi-channel speech in a progressive manner, and outputs a single-channel speech. Using an intelligent speaker scenario as an example, FIG. 1 shows a conventional speech signal processing procedure in a terminal or an electronic device. The process includes a plurality of speech signal processing tasks. The plurality of speech signal processing tasks may specifically include: an echo cancellation task, a speech detection task, a speech direction detection task, a microphone array enhancement task, a single-channel noise reduction task, a de-reverberation task and the like. After an input multi-channel speech is collaboratively processed by the plurality of speech signal processing tasks, a single-channel speech may be output, thus completing the speech signal processing by the terminal.

Deep learning technologies, such as neural network technologies, are being applied to more technical fields. To improve the speech signal processing performance of the terminal, a technology of optimizing the speech signal processing procedure of the terminal by using a neural network has been adopted in the art. The technology is to train a speech signal processing model comprising a neural network and use the speech signal processing model to replace or assist the conventional speech signal processing procedure in the terminal, and to improve the speech signal processing performance of the terminal. Therefore, the training of the speech signal processing model including one or more neural networks is of important technical significance in improving the speech signal processing performance.

Currently, the training of the speech signal processing model based on the neural network is confronted with the problem that the training efficiency of the speech signal processing model is low due to a large quantity of speech signal processing tasks involved in the speech signal processing procedure and complex computations involved in the training.

SUMMARY

This disclosure provide a speech signal processing model training method, an electronic device and a storage medium, to reduce the computational complexity of training the speech signal processing model, and improve the efficiency of training the speech signal processing model.

In order to achieve the foregoing objective, the embodiments of the present invention provide the following technical solutions:

According to an aspect, an embodiment of the present invention provides a speech signal processing model training method, applied to an electronic device, and including:

acquiring a sample speech and determining a task input feature of each speech signal processing task of the sample speech;

determining a target training loss function based on a training loss function of each speech signal processing task; and using the task input feature of each speech signal processing task of the sample speech as a training input of a to-be-trained multi-task neural network, and updating parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

According to another aspect, an embodiment of the present invention further provides a speech signal processing model training apparatus, applied to an electronic device, and including:

a task input feature determining module, configured to acquire a sample speech and determine a task input feature of each speech signal processing task of the sample speech;

a target loss function determining module, configured to determine a target training loss function based on a training loss function of each speech signal processing task; and a model training module, configured to use the task input feature of each speech signal processing task of the sample speech as a training input of a to-be-trained multi-task neural network, and update parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

According to another aspect, an embodiment of the present invention further provides an electronic device, including: at least one memory and at least one processor; the memory storing a program, the processor invoking the program stored by the memory, and the program being configured for:

acquiring a sample speech and determining a task input feature of each speech signal processing task of the sample speech;

determining a target training loss function based on a training loss function of each speech signal processing task; and using the task input feature of each speech signal processing task of the sample speech as a training input of a to-be-trained multi-task neural network, and updating parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

According to another aspect, an embodiment of the present invention further provides a storage medium, storing a program configured to be executed by a processor, the program being used for:

acquiring a sample speech and determining a task input feature of each speech signal processing task of the sample speech;

determining a target training loss function based on a training loss function of each speech signal processing task; and using the task input feature of each speech signal processing task of the sample speech as a training input of a to-be-trained multi-task neural network, and updating parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

The embodiments of the present invention determines the target training loss function based on training loss functions of a plurality of speech signal processing tasks, uses the task input features of the plurality of speech signal processing tasks as the training input of the multi-task neural network, and trains the to-be-trained multi-task neural network by minimizing the target training loss function as a training objective, to obtain the speech signal processing model. The multi-task neural network includes the shared layer and the task layer corresponding to each speech signal processing task, and the speech signal processing model is obtained through training the multi-task neural network, instead of training the neural network respectively for each speech signal processing task, thereby effectively reducing the computational complexity of training the speech signal processing model, and improving the efficiency of training.

BRIEF DESCRIPTION OF THE DRAWINGS

To describe the technical solutions in the embodiments of the present invention more clearly, the following briefly describes the accompanying drawings for illustrating the embodiments. The accompanying drawings with the following description illustrate merely example embodiments of the present invention, and a person of ordinary skill in the art may derive other drawings from these accompanying drawings without creative efforts.

DESCRIPTION OF EMBODIMENTS

Figure 2:
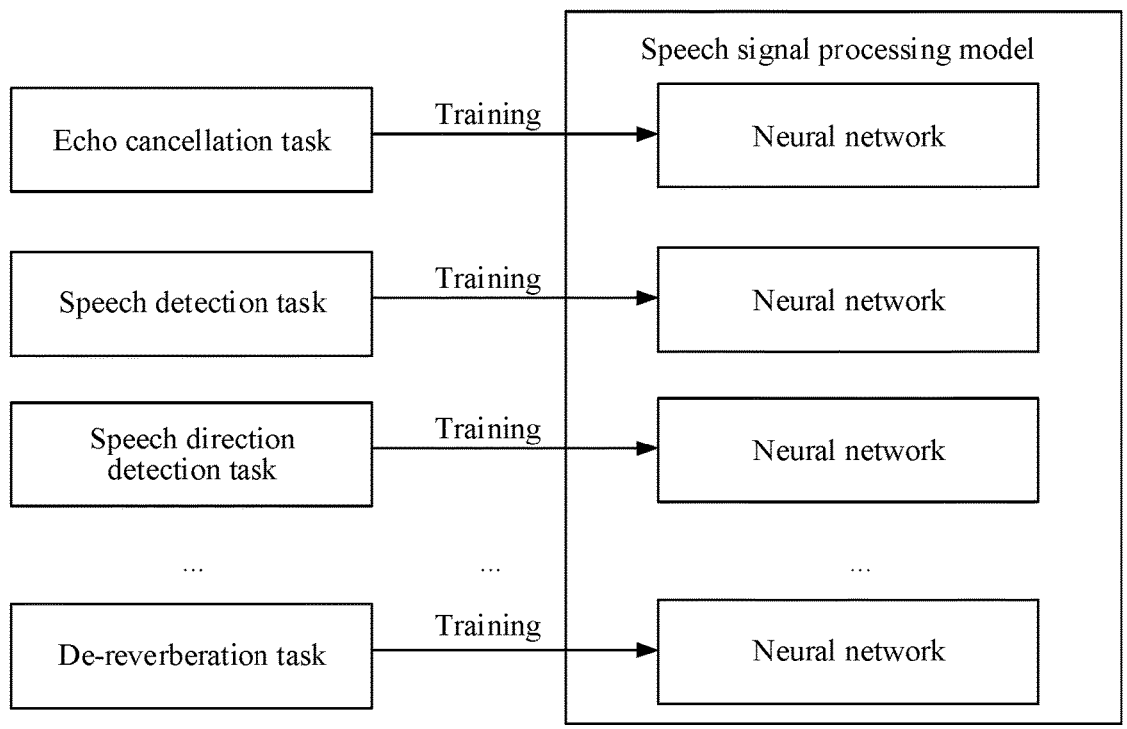
FIG. 2 illustrates a schematic diagram of training a speech signal processing model including neural networks.

FIG. 2 is a schematic diagram of training a speech signal processing model including one or more neural networks. As shown in FIG. 2, a neural network is constructed respectively for each speech signal processing task in a speech signal processing procedure. Each neural network corresponds to a speech signal processing task, and the neural network of each speech signal processing task is trained respectively. When a neural network satisfies a training convergence condition of the corresponding speech signal processing task, the training of the neural network is complete. After the training of each neural network is complete, the trained neural networks are combined to form a speech signal processing model. In FIG. 2, training of a neural network is required for each speech signal processing task and the large quantity of speech signal processing tasks results in high computational complexity of the training. In addition, the neural networks are independent of each other and no leverage between the speech signal processing tasks may be utilized, resulting in limited performance of the trained speech signal processing model.

Based on this, the embodiments described below are directed to improving a neural network structure of a speech signal processing model and training the speech signal processing model based on the improved neural network structure, thereby reducing the computational complexity of training the speech signal processing model and improving the training efficiency. In addition, an association between the speech signal processing tasks is reflected in the training process, to ensure that the trained speech signal processing model has reliable performance.

The following describe the technical solutions in the embodiments of the present invention with reference to the accompanying drawings in the embodiments of the present invention. The embodiments described below are merely examples. Other embodiments may be obtained by a person of ordinary skill in the art based on the embodiments of the present invention without creative efforts. These other embodiments shall fall within the protection scope of the present disclosure.

Figure 3:
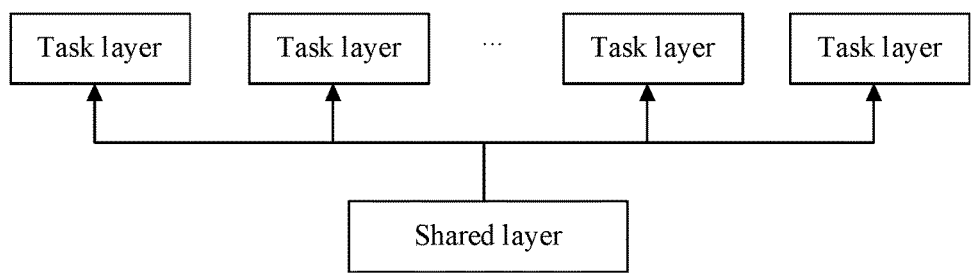
FIG. 3 illustrates a schematic structural diagram of a multi-task neural network according to an embodiment of the present invention.

An embodiment of the present invention provides a novel multi-task neural network. By improving a neural network structure of a speech signal processing model, the multi-task neural network can reduce the computational complexity of training the speech signal processing model and further ensure reliable performance of the speech signal processing model. As shown in FIG. 3, the multi-task neural network may include: a shared layer and a task layer corresponding to each speech signal processing task.

Optionally, in this embodiment of the present invention, an input of the shared layer may be imported into each task layer, and each task layer outputs a task processing result of the speech signal processing task corresponding to the task layer. The shared layer may reflect an association or correlation between the speech signal processing tasks having common features, and each task layer may reflect a task feature of the corresponding speech signal processing task, so that an output result of each task layer can better reflect a task requirement of the corresponding speech signal processing task.

Optionally, in this embodiment of the present invention, the shared layer may be defined as a long short term memory (LSTM) network. In an optional example, the shared layer may be a two-layer LSTM network. The task layer may be defined as a fully connected multi layer perceptron (MLP) network, that is, each task layer may be a fully connected MLP network. Alternatively, each task layer may be a single-layer fully connected network.

Figure 1:
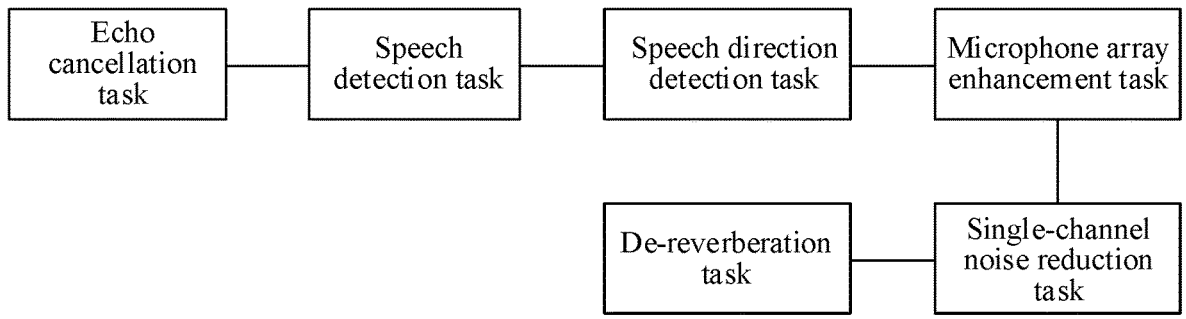
FIG. 1 illustrates a schematic diagram of a speech signal processing procedure.
Figure 4:
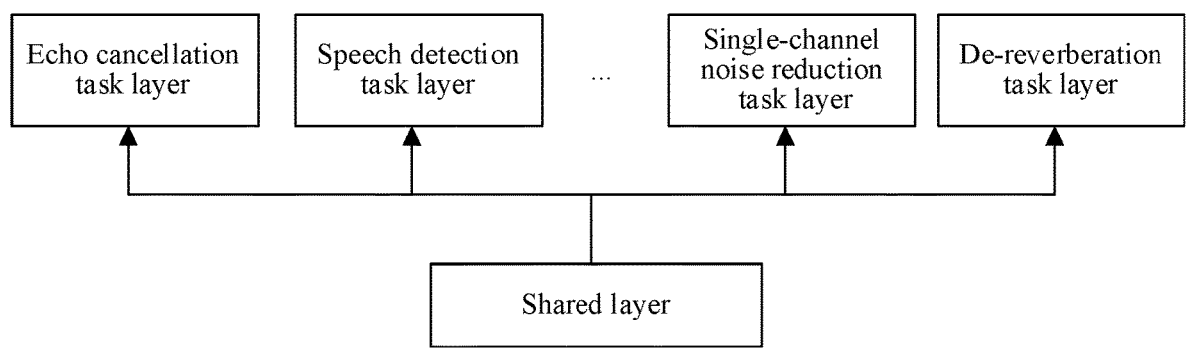
FIG. 4 illustrates another schematic structural diagram of a multi-task neural network according to an embodiment of the present invention.

Using the plurality of speech signal processing tasks shown in FIG. 1 as an example, the multi-task neural network according to this embodiment of the present invention may include, as shown in FIG. 4:

a shared layer, an echo cancellation task layer, a speech detection task layer, . . . , a single-channel noise reduction task layer, and a de-reverberation task layer.

In a specific speech signal processing procedure, the plurality of speech signal processing tasks may not limited to those shown in FIG. 1, and some speech signal processing tasks may be deleted from and/or added to the plurality of speech signal processing tasks shown in FIG. 1. The number and type of speech signal processing tasks are not specifically limited in the embodiments of the present invention.

The neural network according to this embodiment the present invention may be collectively trained to obtain a speech signal processing model.

In an optional implementation of training the speech signal processing model, the multi-task neural network may be trained based on all the speech signal processing tasks simultaneously or collectively by updating training parameters of the shared layer and each task layer of the multi-task neural network.

Figure 5:
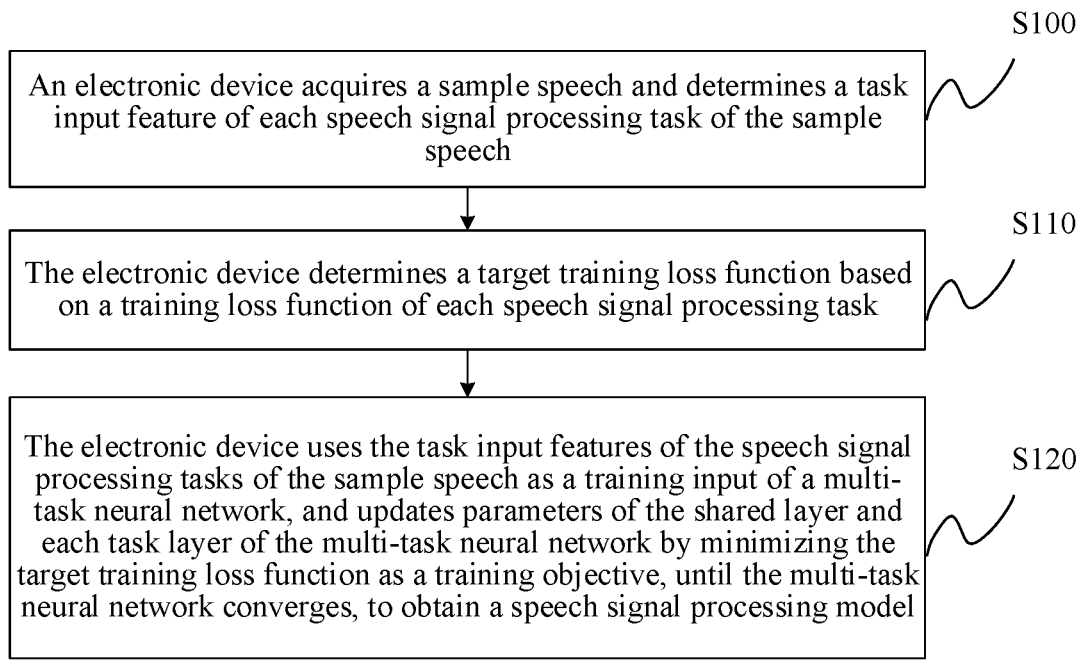
FIG. 5 illustrates a data and logic flow of a speech signal processing model training method according to an embodiment of the present invention.

Optionally, FIG. 5 shows an optional procedure of a speech signal processing model training method according to an embodiment of the present invention. The method may be applied to an electronic device having a data processing capability. The electronic device may be a terminal device having a data processing capability, such as a notebook computer, a personal computer (PC) and the like, or may be a server on a network side. This is not specifically limited in this embodiment of the present invention. Referring to FIG. 5, the procedure may include the following steps.

Step S100: The electronic device acquires a sample speech and determines a task input feature of each speech signal processing task of the sample speech.

Optionally, the sample speech may be considered as a sample used to train a speech signal processing model, and the sample speech may be a multi-channel speech. This embodiment of the present invention may acquire a plurality of sample speeches, and determine, for each sample speech, a task input feature of each speech signal processing task.

For a plurality of speech signal processing tasks involved in a speech signal processing procedure of a terminal, this embodiment of the present invention may acquire a task input feature of each speech signal processing task respectively for a sample speech. For example, the plurality of speech signal processing tasks involved in the speech signal processing procedure of the terminal may be as shown in FIG. 1. In some other implementations, some speech signal processing tasks may be deleted from and/or other forms of speech signal processing tasks may be added to the plurality of speech signal processing tasks shown in FIG. 1.

For example and for ease of understanding, the plurality of speech signal processing tasks may include an echo cancellation task and a speech detection task. The echo cancellation task may be used to estimate a single-channel speech spectrum, and the speech detection task may be used to estimate a speech presence probability. Therefore, this embodiment of the present invention may acquire a task input feature of the echo cancellation task of the sample speech, where the task input feature may include, for example, spectral energy of a noisy single-channel speech of the sample speech and spectral energy of a speech marked as clean. In addition, such an embodiment may acquire a task input feature of the speech detection task of the sample speech, where the task input feature may include, for example, a tag value indicating whether a speech exists in the sample speech. The tag value may be 0 or 1, where 0 indicates the absence of a speech and 1 indicates the presence of a speech.

The speech signal processing tasks described above are examples only, and in practice, the speech signal processing procedure may include more speech signal processing tasks. The embodiments of the present invention may acquire task input features corresponding to different speech signal processing tasks respectively for the sample speech, and different speech signal processing tasks may correspond to different task input features.

Step S110: The electronic device determines a target training loss function based on a training loss function of each speech signal processing task.

This embodiment of the present invention updates the parameters of the shared layer and each task layer of the multi-task neural network by training all the speech signal processing tasks. Therefore, a total training loss function (referred to as the target training loss function) used for training needs to be determined based on the training loss function of each speech signal processing task.

In some implementations, the overall target training loss function may determine from individual training loss function for each speech signal processing task. For example, for any speech signal processing task, this embodiment of the present invention may multiply the training loss function of the speech signal processing task by a weight corresponding to the speech signal processing task to obtain a corresponding multiplication result of the speech signal processing task, so as to determine a corresponding multiplication result of each speech signal processing task; and then obtain the target training loss function by adding the corresponding multiplication results.

As an example, assuming that a training loss function of an $i^{th}$ speech signal processing task is $L_i$, and $a_i$ is a weight corresponding to the $i^{th}$ speech signal processing task, the target training loss function $L_{all}$ may be determined according to the following formula:

$$L_{all} = \sum_{i=1}^{N} \alpha_i L_i;$$

where the value of weighting factors $a_i$ may be set according to an actual situation, or may be set to 1; and N is a total number of speech signal processing tasks.

Step S120: The electronic device uses the task input feature of each speech signal processing task of the sample speech as a training input of the multi-task neural network, and updates parameters of the shared layer and each task layer of the multi-task neural network by minimizing the target training loss function as a training objective in, for example a gradient descent procedure, until the multi-task neural network converges, to obtain a speech signal processing model.

After determining the task input feature of each speech signal processing task of the sample speech and determining the target training loss function for training, this embodiment of the present invention may train the multi-task neural network to update the parameters of the shared layer and each task layer of the multi-task neural network. Specifically, this embodiment of the present invention may use the task input feature of each speech signal processing task of the sample speech as a training input of the multi-task neural network, and train the multi-task neural network b minimizing the target training loss function as a training objective to update the parameters of the shared layer and each task layer of the multi-task neural network, until the multi-task neural network converges, to obtain the speech signal processing model. When the multi-task neural network satisfies a convergence condition, the multi-task neural network converges. The convergence condition may include but is not limited to: the number of iterations of the training reaches a maximum number, or the target training loss function no longer decreases, and the like. This is not specifically limited in this embodiment of the present invention.

For example, after determining the training input and the training objective, this embodiment of the present invention may update the parameters of the shared layer and each task layer of the multi-task neural network by using a stochastic gradient descent (SGD) method and/or a back propagation (BP) method.

In some implementations, in the process of updating the parameters of the shared layer and each task layer of the multi-task neural network by minimizing the target training loss function as the training objective, the training parameters of the shared layer may be updated based on the target training loss function. For example, during each training, the stochastic gradient descent method may be used to update the parameters of the shared layer based on the target training loss function (the overall training loss function) obtained through the each training. The parameters of the separate task layers corresponding to any of speech signal processing tasks may be updated based on the individual loss function of the speech signal processing task. For example, during training using each training speech sample, the stochastic gradient descent method may be used to update the parameters of the task layer corresponding to the speech signal processing task based on the training loss function of the speech signal processing task obtained through the each training. Therefore, not only the shared layer can capture the correlation between the speech signal processing tasks having common features, but also each task layer can be trained to capture individual task feature of the corresponding speech signal processing task, so that an output result of each task layer can better reflect a task requirement of the corresponding speech signal processing task.

Optionally, in an example, the shared layer may include an LSTM network, and a task layer may be a fully connected MLP network. For example, updating the parameters of the shared layer of the multi-task neural network may include updating parameters of the LSTM network, including but not limited to updating, in the LSTM network, connection parameters from an input layer to a hidden layer, connection parameters from the hidden layer to an output layer or connection parameters between the hidden layers. For example, updating the parameters of a task layer of the multi-task neural network may be updating parameters of the fully connected MLP network, including but not limited to updating, in the fully connected MLP network, connection parameters from an input layer to a hidden layer or connection parameters from the hidden layer to an output layer.

Figure 6:
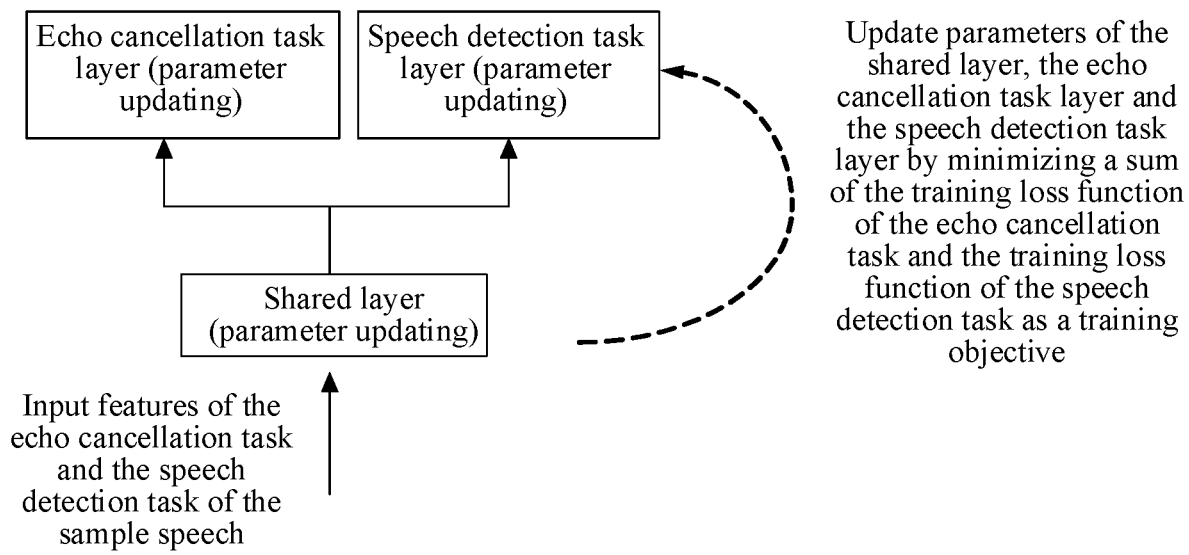
FIG. 6 illustrates a schematic diagram of training a speech signal processing model.

For example, if the weight corresponding to each speech signal processing task is set to 1, and the plurality of speech signal processing tasks includes the echo cancellation task and the speech detection task, the process of training the speech signal processing model may include the following, as shown in FIG. 6:

using input features of the echo cancellation task and the speech detection task of the sample speech as a training input of the multi-task neural network; and updating parameters of the shared layer, the echo cancellation task layer and the speech detection task layer of the multi-task neural network by minimizing a sum of the training loss function of the echo cancellation task and the training loss function of the speech detection task as a training objective, until the number of iterations of the multi-task neural network reaches a maximum number or the sum of the training loss function of the echo cancellation task and the training loss function of the speech detection task no longer decreases, to obtain the speech signal processing model.

Specifically, during each training iteration, the parameters of the shared layer of the multi-task neural network may be updated based on the sum of the training loss function of the echo cancellation task and the training loss function of the speech detection task that are obtained through the each training iteration; the parameters of the echo cancellation task layer may be updated based on the training loss function of the echo cancellation task obtained through each training iteration; and the parameters of the speech detection task layer may be updated based on the training loss function of the speech detection task obtained through each training iteration.

Optionally, generally the training loss function of the echo cancellation task may be, for example, a difference between estimated/predicted clean-speech spectral energy and an actual value (ground truth for the clean-speech spectral energy of the training sample); and the training loss function of the speech detection task may be, for example, a difference between an estimated/predicted speech presence probability and an actual value (whether speech is actually present in the training sample). Correspondingly, if the weight corresponding to each speech signal processing task is set to 1, the target training loss function may be determined as the sum of the training loss function of the echo cancellation task and the training loss function of the speech detection task. Therefore, during the training of the multi-task neural network, minimization of the sum of the training loss function of the echo cancellation task and the training loss function of the speech detection task may be used as the training objective. The minimization of the sum of the training loss function of the echo cancellation task and the training loss function of the speech detection task may specifically include minimizing a sum of the difference between the estimated clean-speech spectral energy and the actual speech energy value and the difference between the estimated speech presence probability and the actual value.

As can be seen, in the speech signal processing model training method shown in FIG. 5, the model parameters of the shared layer and each task layer of the multi-task neural network may be updated based on collectively training the multi-task neural network including the shared layer and the task layer corresponding to each speech signal processing task by using the task input feature of each speech signal processing task of the sample speech as the training input, to obtain the speech signal processing model. Because this embodiment of the present invention simultaneously updates, based on the multi-task neural network including the shared layer and the task layer corresponding to each speech signal processing task, the parameters of the shared layer and each task layer of the multi-task neural network by using the task input feature of each speech signal processing task of the sample speech, instead of training separate neural networks for each speech signal processing task, the computational complexity of training the speech signal processing model is greatly and effectively reduced, and the efficiency of training the speech signal processing model is improved.

Compared with the conventional manner of training a neural network separately for each speech signal processing task, the foregoing manner of training the multi-task neural network based on all the speech signal processing tasks simultaneously to update the parameters of the shared layer and each task layer of the multi-task neural network can reduce the computational complexity. Further, this embodiment of the present invention further provides a solution of training the multi-task neural network by stages. This solution is designed based on distinct task features of each speech signal processing task in the speech signal, and can avoid large differences between speech signal processing tasks in the speech signal processing procedure. In addition, this solution may train the multi-task neural network by using some speech signal processing tasks, thereby ensuring the convergence of the parameters of the multi-task neural network.

Figure 7:
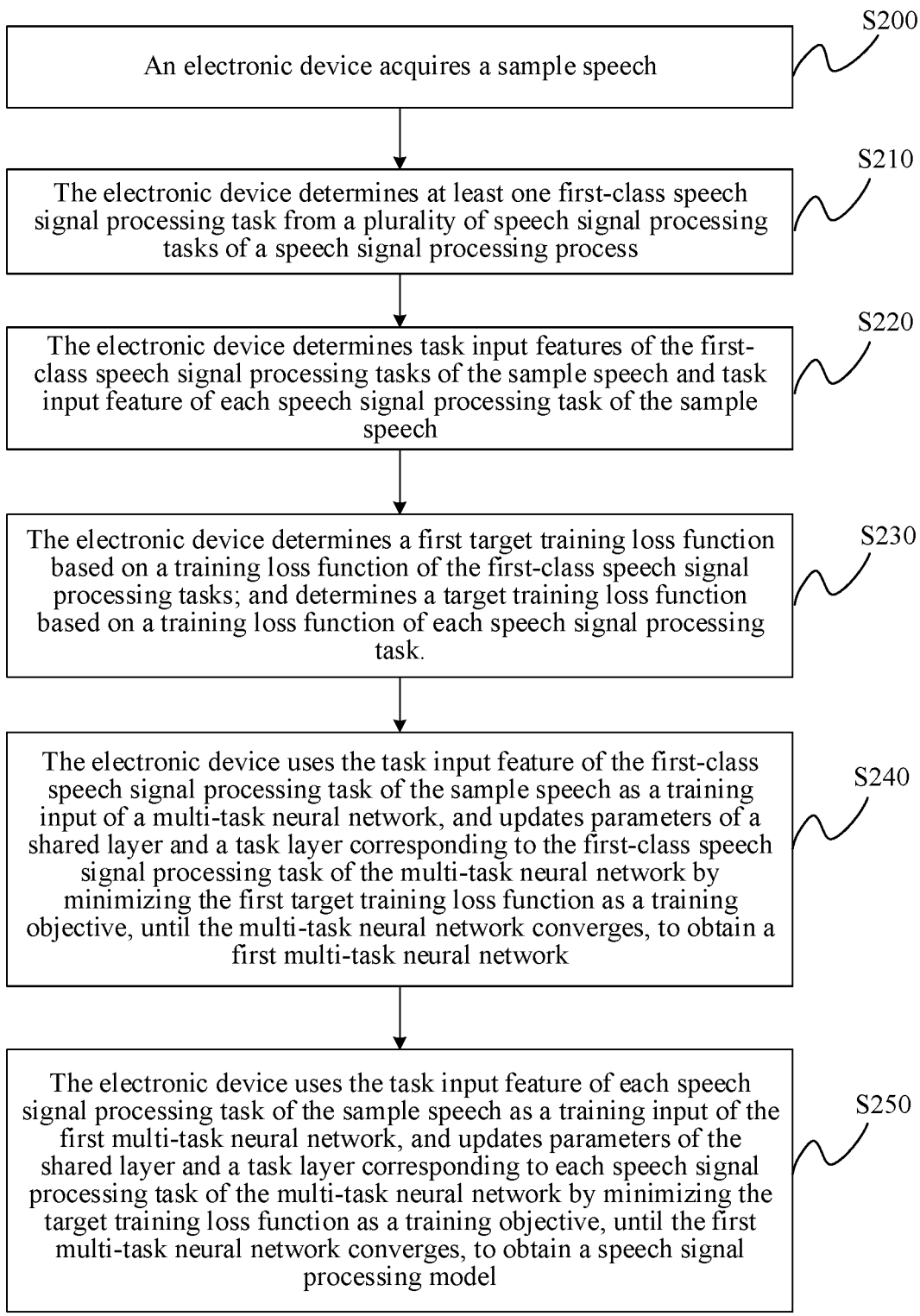
FIG. 7 illustrates a data and logic flow of another speech signal processing model training method according to an embodiment of the present invention.

As an example, FIG. 7 shows another speech signal processing model training method according to an embodiment of the present invention. The method may be implemented in an electronic device having a data processing capability. Referring to FIG. 7, the procedure may include the following steps.

Step S200: The electronic device acquires a sample speech.

Step S210: The electronic device determines at least one first-class speech signal processing task from a plurality of speech signal processing tasks of a speech signal processing procedure.

In some example implementations, the first-class speech signal processing task may include a basic task (or a critical task) in the plurality of speech signal processing tasks involved in the speech signal processing procedure. It may be understood that the basic task may be considered as a task that facilitates or impacts other speech signal processing tasks in the plurality of speech signal processing tasks of the speech signal processing procedure.

For example, the plurality of speech signal processing tasks includes an echo cancellation task and a speech detection task. The echo cancellation task can estimate a single-channel speech spectrum and greatly improve the accuracy of speech probability estimation (thus facilitate the speech detection task). Therefore, the echo cancellation task may be considered as a basic (first-class) speech signal processing task.

Alternatively, the first-class speech signal processing task may be considered as a task having a higher training complexity among the plurality of speech signal processing tasks involved in the speech signal processing procedure.

Correspondingly, a process for determining the first-class speech signal processing task may be as follows: when the training complexity of the speech signal processing task is higher than a set complexity threshold, determining that the speech signal processing task is the first-class speech signal processing task; otherwise, determining that the speech signal processing task is not the first-class speech signal processing task.

For example, the plurality of speech signal processing tasks may include an echo cancellation task and a speech detection task. Clean-speech energy values of all M frequency bands are required for the single-channel speech spectrum estimation performed by the echo cancellation task, where M is generally a positive integer greater than 1. For example, the value of M may be 512. A single value estimate indicating whether a current frame includes a speech is required for the speech presence probability estimation performed by the speech detection task, where M is much greater than 1. Because the training complexity of the echo cancellation task is much higher that of the speech detection task, the echo cancellation task may be considered as a first-class speech signal processing task having a higher training complexity.

In this embodiment of the present invention, one or more first-class speech signal processing tasks may be determined among the plurality of speech signal processing tasks.

Step S220: The electronic device determines a task input feature of the first-class speech signal processing task of the sample speech and a task input feature of each speech signal processing task of the sample speech.

After determining the first-class speech signal processing task, this embodiment of the present invention may determine, for the sample speech, the task input feature of the first-class speech signal processing task of the sample speech. The determining the task input feature of the first-class speech signal processing task may include determining a task input feature of the echo cancellation task of the sample speech. In addition, for each speech signal processing task involved in the speech signal processing procedure, this embodiment of the present invention determines the task input feature of each speech signal processing task of the sample speech. The determination of the task input feature of each speech signal processing task may include determining the task input feature of the echo cancellation task of the sample speech, a task input feature of the speech detection task, and the like.

Step S230: The electronic device determines a first target training loss function based on a training loss function of the first-class speech signal processing task; and determines a target training loss function based on a training loss function of each speech signal processing task.

For example, for the first-class speech signal processing task, this embodiment of the present invention may determine the training loss function of the first-class speech signal processing task. In a case that the there is one or more first-class speech signal processing tasks, this embodiment of the present invention may multiply the training loss functions of the each of the one or more first-class speech signal processing tasks by a weight corresponding to each of the one or more first-class speech signal processing tasks, to obtain a multiplication result for each of the first-class speech signal processing task, so as to determine the multiplication result of each of the one or more first-class speech signal processing tasks; and then obtain the first target training loss function by adding the multiplication results of the one or more first-class speech signal processing tasks.

Specifically, assuming that a training loss function of an ith first-class speech signal processing task is L1i, and a1i is a weight corresponding to the ith first-class speech signal processing task, the first target training loss function L1 all may be determined according to the following formula:

$$L1_{all} = \sum_{i=1}^{N1} \alpha 1_i L1_i,$$

where N1 is a total number of first-class speech signal processing tasks.

For example, this embodiment of the present invention may process each speech signal processing task to obtain the target training loss function with reference to the foregoing step S110.

Step S240: The electronic device uses the task input features of the one or more first-class speech signal processing tasks of the sample speech as a training input of the multi-task neural network, and updates parameters of the shared layer and the one or more task layers corresponding to the one or more first-class speech signal processing task of the multi-task neural network by minimizing the first target training loss function as a training objective, until the multi-task neural network converges, to obtain a first multi-task neural network.

For example, this embodiment of the present invention may first train an initial multi-task neural network based on the task input features of the one or more first-class speech signal processing tasks by minimizing the first target training loss function as the training objective.

During a specific training, the parameters of the shared layer and the task layers corresponding to the one or more first-class speech signal processing tasks of the multi-task neural network may be updated. A specific process of updating the parameters may be as follows: the electronic device uses the task input features of the one or more first-class speech signal processing task of the sample speech as a training input of the multi-task neural network, and updates the parameters of the shared layer and the one or more task layers corresponding to the one or more first-class speech signal processing tasks of the multi-task neural network through a plurality of iterations to minimize the first target training loss function as a training objective, until the number of iterations reaches a maximum number or the first target training loss function no longer decreases, so as to obtain the first multi-task neural network.

In some implementations, this embodiment of the present invention may update the parameters of the shared layer based on the first target training loss function obtained through each training. For each task layer corresponding to each of the one or more first-class speech signal processing tasks, the parameters of the task layer corresponding to each of the one or more first-class speech signal processing tasks may be updated based on the training loss function of the each corresponding first-class speech signal processing task obtained through each training.

Step S250: The electronic device uses the task input features of each of the speech signal processing tasks of the sample speech as a training input to the first multi-task neural network obtained in step 240, and updates parameters of the shared layer and the task layers corresponding the speech signal processing tasks of the multi-task neural network by minimizing the target training loss function as a training objective, until the first multi-task neural network converges, to obtain a speech signal processing model.

As such, this embodiment of the present invention trains the multi-task neural network based on the task input features of the first-class speech signal processing tasks by minimizing the first target training loss function as the training objective, to obtain the first multi-task neural network, and then further trains the first multi-task neural network based on the task input features of each speech signal processing task by minimizing the target training loss function as the training objective, to obtain the speech signal processing model.

For example, the parameters of the shared layer and the task layers corresponding to the speech signal processing tasks of the first multi-task neural network may be updated. A specific process of updating the parameters may be: using the task input features of the speech signal processing tasks of the sample speech as the training input of the first multi-task neural network, and updating the parameters of the shared layer and the task layers corresponding to the speech signal processing tasks of the first multi-task neural network through iterations by minimizing the target training loss function as the training objective, until the number of iterations reaches a maximum number, or the target training loss function no longer decreases, so as to obtain the speech signal processing model.

In some implementations, this embodiment of the present invention may update the parameters of the shared layer based on the target training loss function obtained through each training. For the task layer corresponding to each speech signal processing task, the parameters of the task layer corresponding to the speech signal processing task may be updated based on the training loss function of the speech signal processing task obtained through each training.

Figure 8:
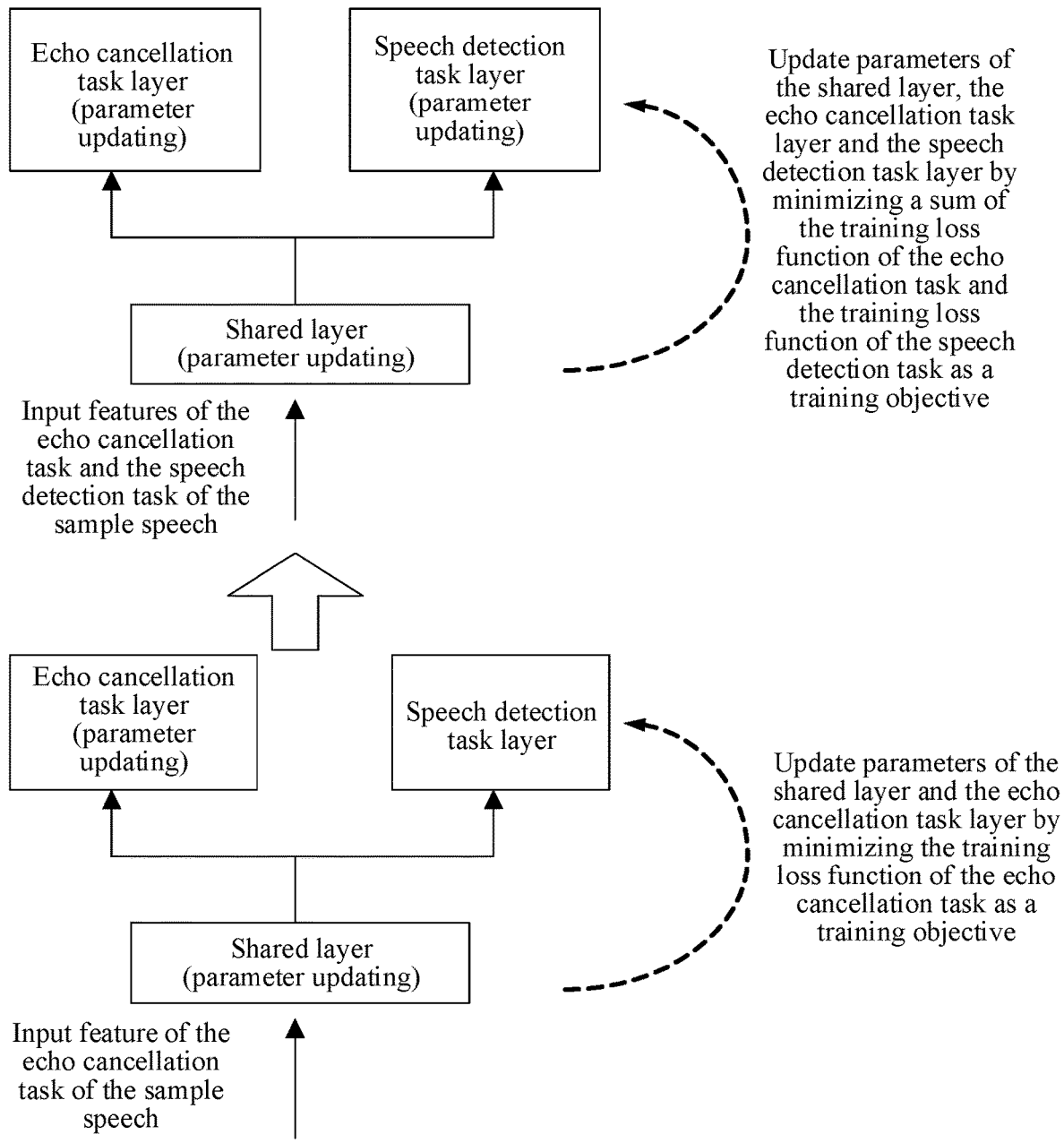
FIG. 8 illustrates another schematic diagram of training a speech signal processing model.

For ease of understanding the sequential training processes shown in step S240 and step S250, an example is given below. In this example, the weight corresponding to each speech signal processing task is set to 1, and the plurality of speech signal processing tasks includes the echo cancellation task and the speech detection task (where the first-class speech signal processing task include the echo cancellation task), the process of training the speech signal processing model according to this embodiment of the present invention may include, as shown in FIG. 8:

first using an input feature of the echo cancellation task of the sample speech as a training input of the multi-task neural network; and updating parameters of the shared layer and the task layer corresponding to the echo cancellation task of the multi-task neural network by minimizing a training loss function of the echo cancellation task as a training objective, until the number of iterations of the multi-task neural network reaches a maximum number or the training loss function of the echo cancellation task no longer decreases, to obtain the first multi-task neural network, where the input feature of the echo cancellation task may be spectral energy of a noisy single-channel speech of the sample speech and spectral energy of a speech marked as clean, and the training objective may be minimizing a difference between estimated clean-speech spectral energy and an actual value; and then, using input features of the echo cancellation task and the speech detection task of the sample speech as a training input of the first multi-task neural network; and updating parameters of the shared layer, the echo cancellation task layer and the speech detection task layer of the first multi-task neural network by minimizing a sum of the training loss function of the echo cancellation task and the training loss function of the speech detection task as a training objective, until the number of iterations of the first multi-task neural network reaches a maximum number or the sum of the training loss function of the echo cancellation task and the training loss function of the speech detection task no longer decreases, to obtain the speech signal processing model.

As can be seen, this embodiment of the present invention may determine, from the plurality of speech signal processing tasks, the basic task or a task having a higher training complexity based on the speech signal processing model training method shown in FIG. 7, to obtain at least one first-class speech signal processing task. Afterwards, this embodiment of the present invention first uses the task input features of the first-class speech signal processing tasks as the training input of the multi-task neural network to perform a training to update the parameters of the shared layer and the task layers corresponding to the first-class speech signal processing tasks of the multi-task neural network, to obtain the first multi-task neural network; and then uses the task input features of all speech signal processing tasks as the training input of the first multi-task neural network to perform a further training to update the parameters of the shared layer and all task layers of the first multi-task neural network, to obtain the speech signal processing model by training.

In this process, because the neural network training is not performed on each speech signal processing task separately, the computational complexity of training the speech signal processing model is reduced. In addition, training the multi-task neural network by first using the input feature of the first-class speech signal processing tasks and then using the task input feature of all speech signal processing tasks as the training input enables the training process to reflect the association and correlation between the speech signal processing tasks, and improve the effective convergence of the parameters of the multi-task neural network and the performance reliability of the trained speech signal processing model.

During the training process of the speech signal processing model, the method shown in FIG. 7 first updates the parameters of the shared layer and the task layers corresponding to the first-class speech signal processing tasks of the multi-task neural network based on the task input features of the first-class speech signal processing tasks, to obtain the first multi-task neural network by training. In the training process of obtaining the first multi-task neural network, because the first-class speech signal processing tasks include basic tasks or tasks having a higher training complexity in the speech signal processing procedure, the effective convergence of the parameters of the task layer corresponding to the first-class speech signal processing tasks is particularly critical for the performance of the speech signal processing model obtained by subsequent training.

Figure 9:
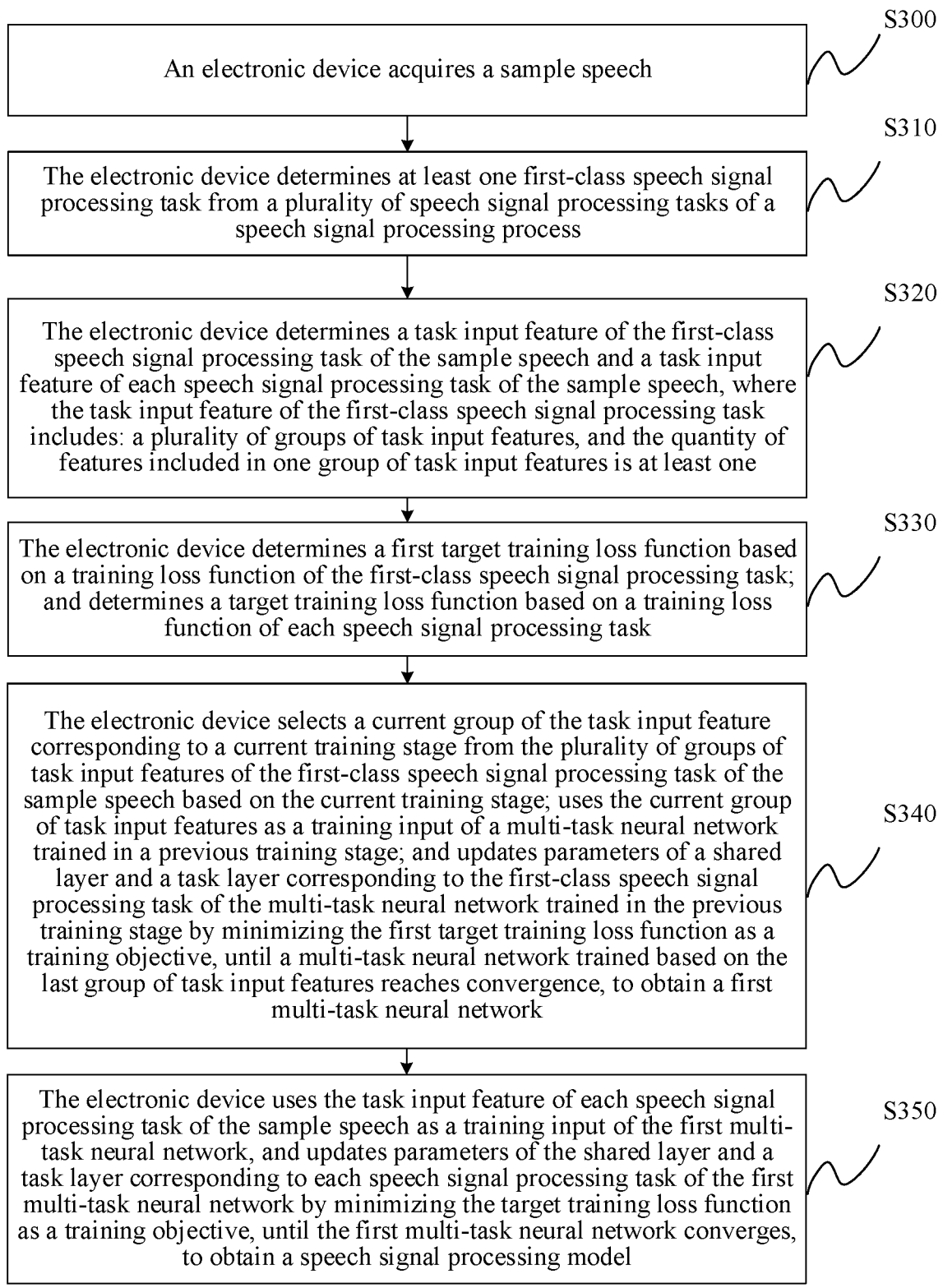
FIG. 9 illustrates a data and logic flow of yet another speech signal processing model training method according to an embodiment of the present invention.

In some implementations, this embodiment the present invention may further perform, in a plurality of stages, the convergence training of the parameters of the task layers corresponding to the first-class speech signal processing tasks based on different input features of the first-class speech signal processing tasks, to further ensure the effective convergence of the parameters of the task layers corresponding to the first-class speech signal processing tasks. FIG. 9 shows an example procedure of a speech signal processing model training method for obtaining the first multi-task neural network according to this embodiment of the present invention. The procedure shown in FIG. 9 is merely one of many examples. In other alternative implementations, during the training of the first multi-task neural network, the first multi-task neural network may be directly trained based on all task input features of the first-class speech signal processing tasks without being trained according to the plurality of training stages as shown in FIG. 9.

The method shown in FIG. 9 may be applied to an electronic device having a data processing capability. Referring to FIG. 9, the procedure may include the following steps.

Step S300: The electronic device acquires a sample speech.

Step S310: The electronic device determines at least one first-class speech signal processing task from a plurality of speech signal processing tasks of a speech signal processing procedure.

For example, the implementation process of step S310 may be similar to the process of step S210. For details of step S310, reference can be made to the description of step S210, and the details are not described herein again.

Step S320: The electronic device determines a task input feature of each of the first-class speech signal processing tasks of the sample speech and a task input feature for each speech signal processing tasks of the sample speech, where the task input features of the first-class speech signal processing tasks includes: a plurality of groups of task input features, and the quantity of features included in one group of task input features is at least one.

For example, in this embodiment of the present invention, each first-class speech signal processing task may have a plurality of groups of task input features, and the quantity of features included in each group of task input features may be at least one.

In an specific example, the first-class speech signal processing task may include an echo cancellation task. In this embodiment of the present invention, a plurality of groups of task input features may be set for the echo cancellation task. For example, a first group of task input features of the echo cancellation task includes spectral energy of a noisy single-channel speech and spectral energy of a speech marked as clean; a second group of task input features of the echo cancellation task may include spectral energy of a multi-channel speech; and a third group of task input features of the echo cancellation task may include the spectral energy of the multi-channel speech, spectral energy of a reference signal (such as music played by an intelligent speaker), and the like.

Step S330: The electronic device determines a first target training loss function based on a training loss function of the first-class speech signal processing tasks; and determines a target training loss function based on a training loss function of all speech signal processing tasks.

For example, the implementation process of step S330 may be similar to the process of step S230. For details of step S330, reference can be made to the description of step S230, and the details are not described herein again.

Step S340: The electronic device selects a current group of task input features corresponding to a current training stage from the plurality of groups of task input features of the first-class speech signal processing tasks of the sample speech based on the current training stage; uses the current group of task input features as a training input of a multi-task neural network trained in a previous training stage; and updates parameters of a shared layer and task layers corresponding to the first-class speech signal processing tasks of the multi-task neural network trained in the previous training stage by minimizing the first target training loss function as a training objective, until a multi-task neural network trained based on the last group of task input features reaches convergence, to obtain a first multi-task neural network.

For example, step S340 may be implemented for the electronic device to train the multi-task neural network progressively in a plurality of training stages based on the plurality of groups of task input features of the first-class speech signal processing tasks of the sample speech, to obtain the first multi-task neural network. One training stage uses one group of task input features as a training input, and minimizes the first target training loss function as the training objective. A process of training the multi-task neural network progressively in the plurality of training stages may include updating the parameters of the shared layer and the task layer corresponding to the first-class speech signal processing tasks of the multi-task neural network progressively in the plurality of training stages. In addition to being implemented according to step S340, this embodiment of the present invention does not exclude other manners of training the multi-task neural network progressively in a plurality of training stages by using the plurality of groups of task input features of the first-class speech signal processing tasks of the sample speech.

In some implementations of step S340, this embodiment of the present invention may train the first multi-task neural network in the plurality of training stages, so as to train the multi-task neural network by separately using each of the groups of task input features of the first-class speech signal processing tasks as a training input in each of the training stages, to obtain the first multi-task neural network. In addition, in the current training stage, the group of task input features selected in a current training stage by the first-class speech signal processing tasks are used as the training input to the multi-task neural network trained in the previous training stage.

As an example, the first-class speech signal processing task(s) may three groups of task input features, that is, a first group of task input features, a second group of task input features, and a third group of task input features. In this case, this embodiment of the present invention may first use the first group of task input features as a training input of a to-be-trained multi-task neural network, and updates the parameters of the shared layer and the task layer corresponding to the first-class speech signal processing task(s) of the multi-task neural network by minimizing the first target training loss function as a training objective, until a multi-task neural network trained based on the first group of task input features reaches convergence, to obtain a multi-task neural network trained in a first training stage. A process of using the first group of task input features as the training input of the to-be-trained multi-task neural network may be as follows: for the first training stage, the selected task input features of the current training stage include the first group of task input features.

Then, this embodiment of the present invention uses the second group of task input features as a training input of the multi-task neural network trained and obtained in the first training stage, and updates parameters of the shared layer and the task layer corresponding to the first-class speech signal processing task(s) of the multi-task neural network trained in the first training stage by minimizing the first target training loss function as a training objective, until a multi-task neural network trained based on the second group of task input features reaches convergence, to obtain a multi-task neural network trained in the second training stage. A process of using the second group of task input features as the training input of the multi-task neural network trained in the first training stage may be as follows: for the second training stage, the selected task input features of the current training stage include the second group of task input features.

Then, this embodiment of the present invention uses the third group of task input features as a training input of the multi-task neural network trained and obtained in the second training stage, and updates parameters of the shared layer and the task layer corresponding to the first-class speech signal processing task(s) of the multi-task neural network trained in the second training stage by minimizing the first target training loss function as a training objective, until a multi-task neural network trained based on the third group of task input features reaches convergence, to obtain the first multi-task neural network, thereby completing the process of training the first multi-task neural network in a plurality of training stages based on the plurality of groups of task input features of the first-class speech signal processing task. A process of using the third group of task input features as the training input of the multi-task neural network trained in the second training stage may be as follows: for a third training stage, the selected task input feature of the current training stage include the third group of task input features.

For ease of understanding, assuming that the first-class speech signal processing task(s) include an echo cancellation task, the first group of task input features of the echo cancellation task includes spectral energy of a noisy single-channel speech and spectral energy of a speech marked as clean; the second group of task input features of the echo cancellation task includes spectral energy of a multi-channel speech; and the third group of task input features of the echo cancellation task includes the spectral energy of the multi-channel speech, spectral energy of a reference signal and the like. The spectral energy of the reference signal may be music played by an intelligent speaker.

Correspondingly, this embodiment of the present invention may first use the spectral energy of the noisy single-channel speech and the spectral energy of the speech marked as clean of the sample speech as a training input of the multi-task neural network, and updates the parameters of the shared layer and the task layer of the echo cancellation task of the multi-task neural network by minimizing a difference between estimated clean-speech spectral energy and an actual value as a training objective, until the number of iterations reaches a maximum number or the training objective no longer decreases.

Then, this embodiment of the present invention uses the spectral energy of the multi-channel speech of the sample speech as a training input of the multi-task neural network trained in the previous stage, and updates the parameters of the shared layer and the task layer of the echo cancellation task of the multi-task neural network by minimizing the difference between the estimated clean-speech spectral energy and the actual value as a training objective, until the number of iterations reaches a maximum number or the training objective no longer decreases, so that the trained multi-task neural network has a multi-channel spatial filtering capability.

After completing the multi-channel training, this embodiment of the present invention may further use the spectral energy of the multi-channel speech and the spectral energy of the reference signal of the sample speech as a training input of the multi-task neural network trained in the previous stage, and updates the parameters of the shared layer and the task layer of the echo cancellation task of the multi-task neural network by minimizing the difference between the estimated clean-speech spectral energy and the actual value as a training objective, until the number of iterations reaches a maximum number or the training objective no longer decreases, to obtain the first multi-task neural network, so that the first multi-task neural network can better fit a multi-channel input signal and the reference signal.

The foregoing specific example of using a plurality of groups of task input features of the first-class speech signal processing tasks is merely one of many examples. In this embodiment of the present invention, the number of groups of task input features of the first-class speech signal processing tasks and specific features included in each group of task input features may be set according to a specific situation. For example, in the foregoing example, the task input features including the spectral energy of the noisy single-channel speech, the spectral energy of the speech marked as clean and the spectral energy of the multi-channel speech may also be combined into one group for training.

Step S350: The electronic device may use the task input features of all speech signal processing task of the sample speech as a training input of the first multi-task neural network, and updates parameters of the shared layer and the task layers corresponding to all speech signal processing tasks of the first multi-task neural network by minimizing the target training loss function as a training objective, until the first multi-task neural network converges, to obtain a speech signal processing model.

In some implementations, step S350 may be similar to the process of step S250. For details of step S350, reference can be made to the description of step S250, and the details are not described herein again.

For example, after the first multi-task neural network is obtained, speech signal processing tasks such as speech detection, direction detection and de-reverberation are simple tasks independent of each other, and may be combined for training. Therefore, after the first multi-task neural network is obtained, the task input features of each speech signal processing task of the sample speech may be combined for training the first multi-task neural network, to obtain the speech signal processing model.

For all the foregoing training manners, in the process of updating the parameters of the shared layer and a task layer, the parameters of the shared layer are updated based on a sum of training loss functions of all tasks used for the current training; and the parameters of the task layer are updated based on a training loss function of a task corresponding to the task layer. Therefore, the trained speech signal processing model not only can reflect an association or correlation between the speech signal processing tasks having common features through the shared layer, but also can reflect the task feature of the corresponding speech signal processing task through each task layer.

Figure 10:
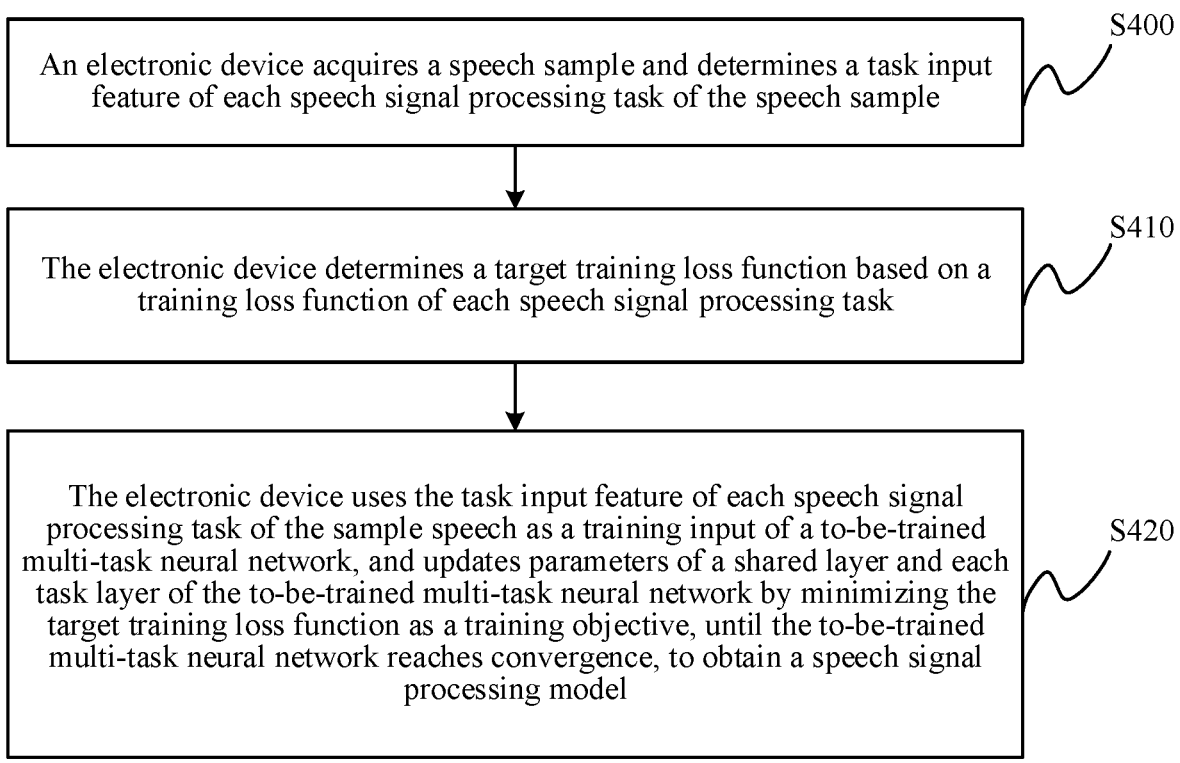
FIG. 10 illustrates a data and logic flow of still another speech signal processing model training method according to an embodiment of the present invention.

To summarize the training processes of the speech signal processing model described above, a basic core procedure of the speech signal processing model training method according to the embodiments of the present invention may be as shown in FIG. 10. FIG. 10 shows an example procedure of a speech signal processing model training method according to an embodiment of the present invention. Referring to FIG. 10, the procedure may include the following steps.

Step S400: An electronic device acquires a speech sample and determines a task input feature of each speech signal processing task of the speech sample.

For some implementation of step S400, reference can be made to the description of step S100. Step S400 may be similar to the process of step S100, and the details are not described herein again.

Step S410: The electronic device determines a target training loss function based on a training loss function of each speech signal processing task.

For some implementation of step S410, reference can be made to the description of step S110. Step S410 is similar to the process of step S110, and the details are not described herein again.

Step S420: The electronic device uses the task input features of all speech signal processing task of the sample speech as a training input of a to-be-trained multi-task neural network, and updates parameters of a shared layer and task layers of the to-be-trained multi-task neural network by minimizing the target training loss function as a training objective, until the to-be-trained multi-task neural network reaches convergence, to obtain a speech signal processing model.

For example, in step S420, the to-be-trained multi-task neural network may be an initial multi-task neural network (the corresponding process may be implemented by the procedure shown in FIG. 5).

Alternatively, in step S420, the to-be-trained multi-task neural network may be a first multi-task neural network. This embodiment of the present invention may first obtain the first multi-task neural network through training using the method procedure of training the first multi-task neural network as shown in FIG. 7, and use the first multi-task neural network as the to-be-trained multi-task neural network; then use the task input features of speech signal processing tasks of the sample speech as a training input of the first multi-task neural network by using the method shown in FIG. 10; and update parameters of the shared layer and the task layers of the first multi-task neural network by minimizing the target training loss function as a training objective, until the first multi-task neural network converges, to obtain the speech signal processing model.

In some implementations, the first multi-task neural network may be trained based on the task input features of the first-class speech signal processing tasks of the sample speech. Further, in an optional example, the first-class speech signal processing tasks may have a plurality of groups of task input features. This embodiment of the present invention may train the first multi-task neural network in a plurality of training stages based on the training procedure of the first multi-task neural network as shown in FIG. 9.

Regardless of whether the foregoing to-be-trained multi-task neural network is the initial multi-task neural network or the first multi-task neural network, the structure of the to-be-trained multi-task neural network includes a shared layer and task layers each corresponding to one of speech signal processing task. For the shared layer, the parameters of the shared layer are updated based on the target training loss function by minimizing the target training loss function as the training objective. For the task layer corresponding to any of speech signal processing tasks, the parameters of the task layers of the speech signal processing task are updated based on the training loss function of each of the speech signal processing tasks by minimizing the target training loss function as the training objective.

The speech signal processing model training method according to this embodiment of the present invention may generate the speech signal processing model through training based on the multi-task neural network including the shared layer and the task layers corresponding to each of the speech signal processing tasks, instead of training a neural network separately for each speech signal processing task, thereby effectively reducing the computational complexity of training the speech signal processing model, and improving the efficiency of training.

Further, in the training process, the speech signal processing model is first trained based on the task input features of the first-class speech signal processing tasks of the sample speech, and then trained based on the task input features of each speech signal processing task. Therefore, an association and correlation between a plurality of tasks in the speech signal processing procedure can be identified, thereby improving the performance of speech signal processing, and ensuring the reliable performance of the trained speech signal processing model.

After obtaining the speech signal processing model through training by using the foregoing method, the embodiments of the present invention may use the speech signal processing model to replace the conventional speech signal processing procedure of the terminal. For example, the output result of each task layer of the speech signal processing model may be specifically used to replace the conventional task processing result of the speech signal processing task corresponding to each task layer of the terminal.

In another implementation, the embodiments of the present invention may use the speech signal processing model to assist the conventional speech signal processing procedure of the terminal. For example, the output of each task layer of the speech signal processing model may be specifically used to assist task processing in the conventional corresponding speech signal processing task of the terminal.

Figure 11:
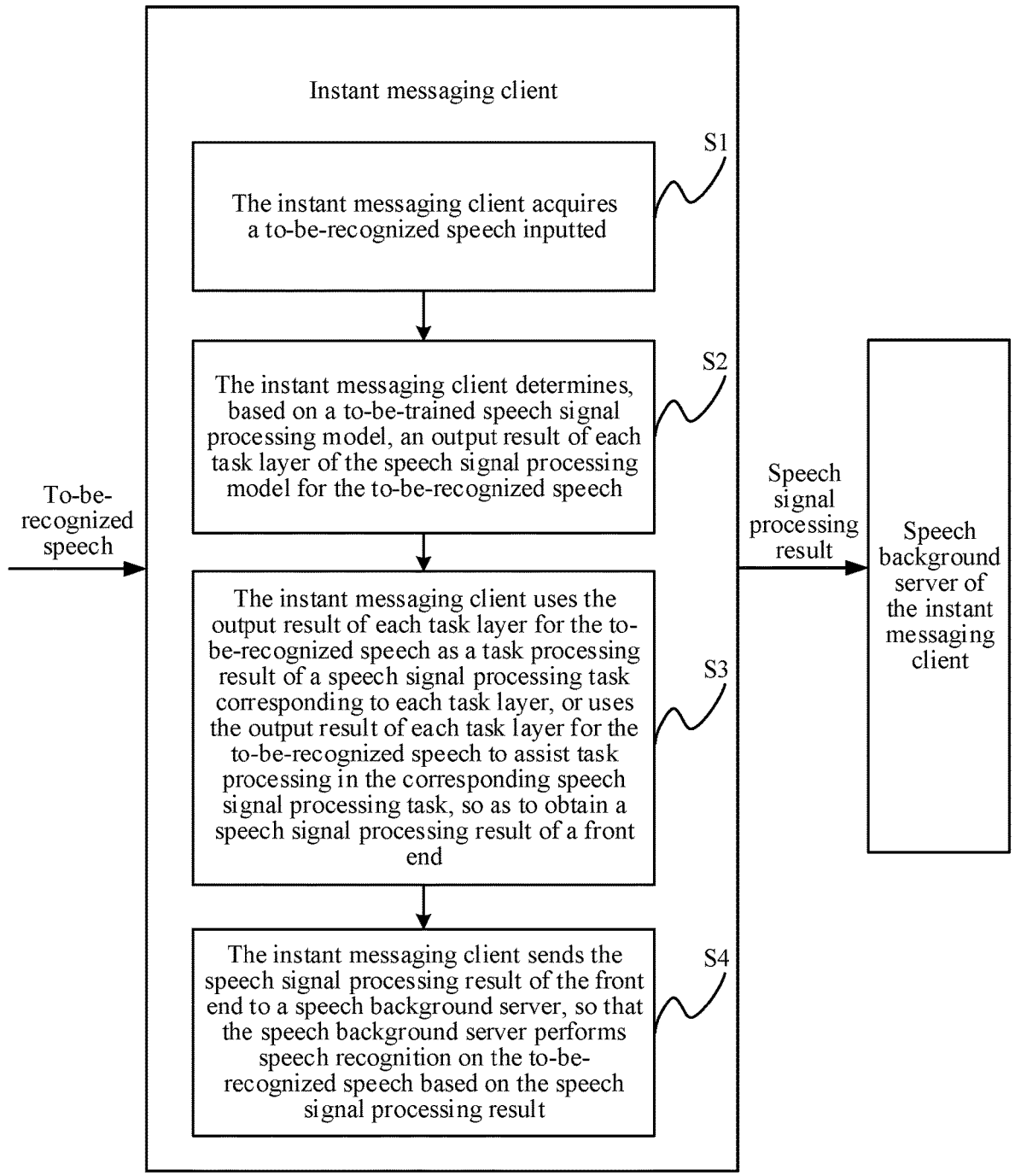
FIG. 11 illustrates a schematic diagram of an application scenario of a speech signal processing model.

FIG. 11 is a schematic diagram of an application scenario of a speech signal processing model. As shown in FIG. 11, after the speech signal processing model is generated through training, in the embodiments of the present invention, speech signal processing in a front end device may be performed on a to-be-recognized speech input into an instant messaging application client by using the speech signal processing model, and then the processed speech may be transmitted to a speech backend server of the instant messaging application for speech recognition. In some implementations, the instant messaging application client may use the output of each task layer of the speech signal processing model for the to-be-recognized speech as an assisting processing information to facilitate further processing of the corresponding speech signal processing task, thereby improving the output accuracy of the result of each speech signal processing task.

Referring to FIG. 11, as an example application scenario, on a basis that the instant messaging application client loads the trained speech signal processing model of the embodiments of the present invention, a specific application process may include the following steps.

S1. An instant messaging application client acquires a to-be-recognized speech input.

S2. The instant messaging application client determines, based on a to-be-trained speech signal processing model, an output result of each task layer of the speech signal processing model for the to-be-recognized speech.

The speech signal processing model is obtained through training a multi-task neural network by minimizing a target training loss function as a training objective. The target training loss function is determined based on a training loss function of each speech signal processing task. The multi-task neural network includes a shared layer and task layers each corresponding to one of the speech signal processing tasks.

S3. The instant messaging client uses the output result of each task layer for the to-be-recognized speech as a task processing result of the speech signal processing task corresponding to each task layer, or uses the output result of each task layer for the to-be-recognized speech to facilitate and assist in further processing of the corresponding speech signal processing task, so as to obtain a speech signal processing result of in the front end device.

S4. The instant messaging client sends the speech signal processing result at the frontend device to a speech backend server, so that the speech backend server performs speech recognition on the to-be-recognized speech based on the speech signal processing result.

Figure 12:
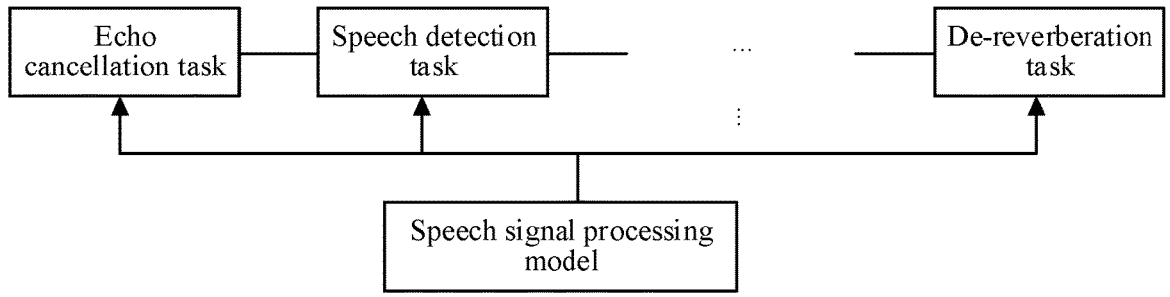
FIG. 12 illustrates a schematic diagram of using an output result of a speech signal processing model.

Optionally, FIG. 12 is a schematic diagram of using an output result of a speech signal processing model. Referring to FIG. 12, for a conventional echo cancellation task of the terminal, an echo cancellation task layer of the speech signal processing model may output a speech spectrum estimation result of the to-be-recognized speech, so as to use the speech spectrum estimation result as an assisting processing signal of the conventional echo cancellation task of the terminal, so that the echo cancellation task may better distinguish a ratio of the reference signal and the speech signal during processing, thereby improving an accuracy of an output result of the echo cancellation task. Alternatively, the embodiments of the present invention may also directly use the output result of the echo cancellation task layer of the speech signal processing model for the to-be-recognized speech as the output result of the echo cancellation task.

For a speech detection task, a speech detection task layer of the speech signal processing model may output an output result of the to-be-recognized speech, and use the output result as an assisting processing signal of the conventional speech detection task of the terminal, so as to improve an accuracy of the output result of the speech detection task. A weighted average value of an output result of the speech detection task layer and the output result of the conventional speech detection task of the terminal may be used as a final output result of the speech detection task. Alternatively, the embodiments of the present invention may also directly use the output result of the speech detection task layer of the speech signal processing model for the to-be-recognized speech as the output result of the speech detection task.

For a speech direction detection task, a speech direction detection task layer of the speech signal processing model may output an output result of the to-be-recognized speech, so that the output result is used to assist the conventional speech direction detection task of the terminal to estimate the speech and noise of the to-be-recognized speech, so as to obtain a more accurate speech direction estimation result. The result of the to-be-recognized speech output by the speech direction detection task layer may include: the speech/noise spectrum estimation result of the to-be-recognized speech. Alternatively, the embodiments of the present invention may also directly use the speech/noise spectrum estimation result of the to-be-recognized speech outputted by the speech direction detection task layer as the output result of speech direction detection task.

For a microphone array enhancement task, a microphone array enhancement task layer of the speech signal processing model may output a speech/noise spectrum of the to-be-recognized speech, to assist the conventional microphone array enhancement task of the terminal to more accurately estimate a target direction using an array algorithm and more accurately estimate parameters used in the array algorithm such as a noise covariance matrix. Alternatively, the embodiments of the present invention may also directly use the output result of the microphone array enhancement task layer as the output result of the microphone array enhancement task.

For a single-channel noise reduction task, a single-channel noise reduction task layer of the speech signal processing model may output the speech/noise spectrum of the to-be-recognized speech, to assist the conventional single-channel noise reduction task of the terminal to obtain key parameters needed in the single-channel noise reduction task such as a signal-noise ratio, to improve the processing performance of the single-channel noise reduction task. Alternatively, the embodiments of the present invention may also directly use the output result of the single-channel noise reduction task layer as the output result of the single-channel noise reduction task.

For a de-reverberation task, a de-reverberation task layer of the speech signal processing model may output a room reverberation estimation, to assist the conventional de-reverberation task of the terminal to regulate the parameters of the de-reverberation algorithm, so as to control a level of de-reverberation. Alternatively, the embodiments of the present invention may also directly use the output result of the de-reverberation task layer as the output result of the de-reverberation task.

The above application scenario of the speech signal processing model to the speech signal processing procedure of the to-be-recognized speech is merely an example application for the speech signal processing procedure in an intelligent speaker scenario. In different application scenarios, the manner in which the speech signal processing model is applied may be adjusted according to an actual situation. In these other situations, the speech signal processing model discussed above may be used to replace conventional speech signal processing procedure, or, may be used to generate output that assists in or felicitates the conventional speech signal processing.

The following describes a speech signal processing model training apparatus provided in the embodiments of the present invention. The speech signal processing model training apparatus described below may be considered as, a program module needed to be arranged by an electronic device or hardware processing unit to implement the speech signal processing model training method provided in the embodiments of the present invention. The speech signal processing model training apparatus described below may correspond to the speech signal processing model training method described above.

Figure 13:
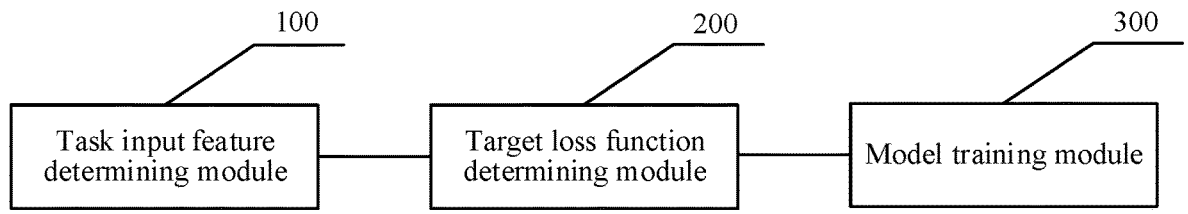
FIG. 13 illustrates a structural block diagram of a speech signal processing model training apparatus according to an embodiment of the present invention.

FIG. 13 is a structural block diagram of a speech signal processing model training apparatus according to an embodiment of the present invention. The apparatus may be applied to an electronic device having a data processing capability. Referring to FIG. 13, the apparatus may include:

a task input feature determining module 100, configured to acquire a sample speech and determine a task input feature of each speech signal processing task of the sample speech;

a target loss function determining module 200, configured to determine a target training loss function based on a training loss function of each speech signal processing task; and a model training module 300, configured to use the task input feature of each speech signal processing task of the sample speech as a training input of a to-be-trained multi-task neural network, and update parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

Optionally, the model training module 300 being configured to update parameters of a shared layer and each task layer of the to-be-trained multi-task neural network by minimizing the target training loss function as a training objective specifically includes:

for the shared layer, updating the parameters of the shared layer based on the target training loss function by minimizing the target training loss function as the training objective; and for the task layer corresponding to any speech signal processing task, updating the parameters of the task layer of the speech signal processing task based on the training loss function of the speech signal processing task by minimizing the target training loss function as the training objective.

Figure 14:
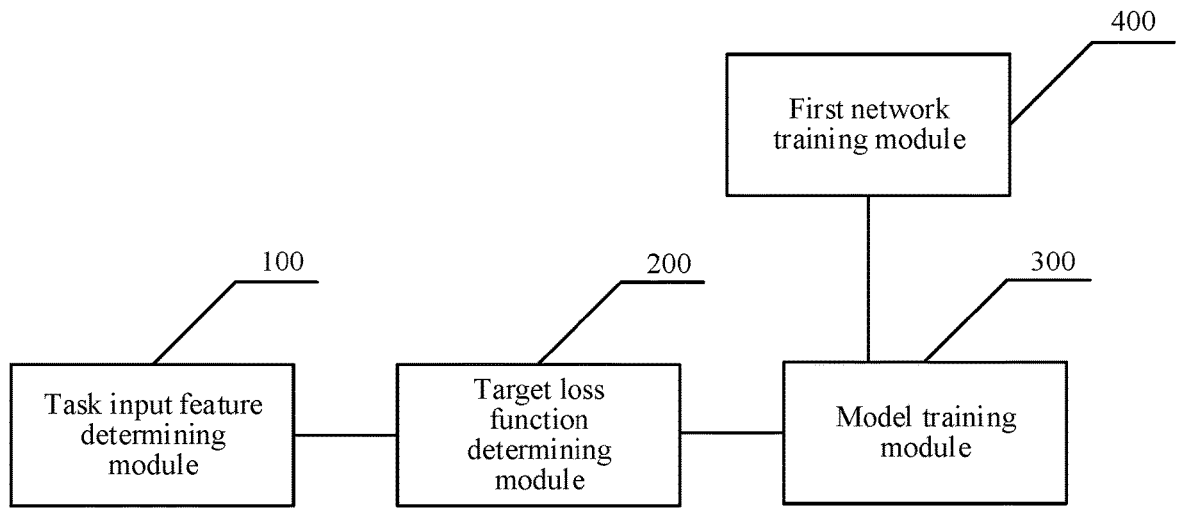
FIG. 14 illustrates another structural block diagram of a speech signal processing model training apparatus according to an embodiment of the present invention.

Optionally, the to-be-trained multi-task neural network may include a first multi-task neural network. Correspondingly, FIG. 14 is another structural block diagram of a speech signal processing model training apparatus according to an embodiment of the present invention. With reference to FIG. 13 and FIG. 14, the apparatus may further include:

a first network training module 400, configured to determine one or more first-class speech signal processing tasks from a plurality of speech signal processing tasks of a speech signal processing procedure; determine a task input feature of the first-class speech signal processing tasks of the sample speech; determine a first target training loss function based on a training loss function of each of the first-class speech signal processing task; and use the task input features of the first-class speech signal processing tasks of the sample speech as a training input of an initial multi-task neural network, and update parameters of a shared layer and a task layer corresponding to each of the first-class speech signal processing tasks of the initial multi-task neural network by minimizing the first target training loss function as a training objective, until the initial multi-task neural network converges, to obtain the first multi-task neural network.

Optionally, the first network training module 400 being configured to determine one or more first-class speech signal processing tasks from a plurality of speech signal processing tasks of a speech signal processing procedure specifically includes:

determining a basic task from the plurality of speech signal processing tasks, and determining the basic task as one of the first-class speech signal processing tasks, the basic task being a task providing an auxiliary effect for other speech signal processing tasks in the plurality of speech signal processing tasks.

Optionally, the first network training module 400 being configured to determine one or more first-class speech signal processing tasks from a plurality of speech signal processing tasks of a speech signal processing procedure specifically includes:

determining, from the plurality of speech signal processing tasks, a speech signal processing task having a training complexity higher than a set complexity threshold as the first-class speech signal processing task.

Optionally, the first network training module 400 being configured to determine a first target training loss function based on a training loss function of each of the first-class speech signal processing tasks specifically includes:

for any first-class speech signal processing task, multiplying the training loss function of the first-class speech signal processing task by a weight corresponding to the first-class speech signal processing task to obtain a multiplication result of the first-class speech signal processing task, so as to determine a multiplication result of each first-class speech signal processing task; and obtaining the first target training loss function by adding the multiplication result of each of the first-class speech signal processing tasks.

Optionally, the task input features of the first-class speech signal processing tasks of the sample speech includes: a plurality of groups task input features. The quantity of features included in one group of task input features is at least one.

Correspondingly, the first network training module 400 being configured to use the task input features of the first-class speech signal processing tasks of the sample speech as a training input of an initial multi-task neural network, and update parameters of a shared layer and a task layer corresponding to each of the first-class speech signal processing tasks of the initial multi-task neural network by minimizing the first target training loss function as a training objective, until the initial multi-task neural network converges, to obtain the first multi-task neural network specifically includes:

training the initial multi-task neural network progressively based on the plurality of groups of task input features of the first-class speech signal processing tasks of the sample speech in a plurality of training stages, to obtain the first multi-task neural network, one training stage using one group of task input features of the first-class speech signal processing tasks of the sample speech as a training input, and minimizing the first target training loss function as a training objective.

Optionally, the first network training module 400 being configured to train the initial multi-task neural network progressively based on the plurality of groups of task input features of the first-class speech signal processing tasks of the sample speech in a plurality of training stages, to obtain the first multi-task neural network specifically includes:

selecting a current group of task input features corresponding to a current training stage from the plurality of groups of task input features of the first-class speech signal processing tasks of the sample speech based on the current training stage; and using the current group of task input features as a training input of the multi-task neural network trained in a previous training stage, and updating parameters of the shared layer and the task layers corresponding to the first-class speech signal processing tasks of the multi-task neural network trained in the previous training stage by minimizing the first target training loss function as a training objective, until a multi-task neural network trained based on a last group of task input features reaches convergence, to obtain the first multi-task neural network.

Optionally, in another implementation, the to-be-trained multi-task neural network may include an initial multi-task neural network. The target loss function determining module 200 being configured to determine a target training loss function based on a training loss function of each speech signal processing task specifically includes:

for any speech signal processing task, multiplying the training loss function of the speech signal processing task by a weight corresponding to the speech signal processing task to obtain a corresponding multiplication result of the speech signal processing task, so as to determine a corresponding multiplication result of each speech signal processing task; and obtaining the target training loss function by adding the corresponding multiplication result of each speech signal processing task.

Optionally, the shared layer in the multi-task neural network may include an LSTM network. Each task layer of the multi-task neural network may include a fully connected MLP network corresponding to each speech signal processing task.

Optionally, the model training module 300 being configured to update parameters of a shared layer and each task layer of the to-be-trained multi-task neural network may specifically include:

updating, in the LSTM network of the to-be-trained multi-task neural network, connection parameters from an input layer to a hidden layer, connection parameters from the hidden layer to an output layer or connection parameters between the hidden layers; and updating, in the fully connected MLP network corresponding to each speech signal processing task, connection parameters from an input layer to a hidden layer or connection parameters from the hidden layer to an output layer.

Figure 15:
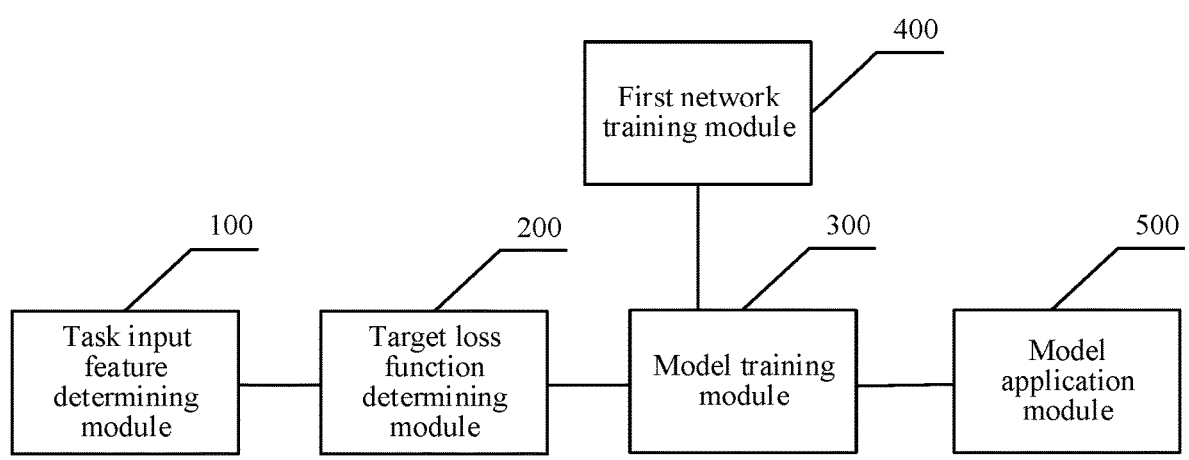
FIG. 15 illustrates yet another structural block diagram of a speech signal processing model training apparatus according to an embodiment of the present invention.

Optionally, after training the speech signal processing model, the model training module 300 may be applied in the speech signal processing procedure at a speech front end. Optionally, FIG. 15 is yet another structural block diagram of a speech signal processing model training apparatus according to an embodiment of the present invention. With reference to FIG. 14 and FIG. 15, the apparatus may further include:

a model application module 500, configured to determine an output result of each task layer of the speech signal processing model for the to-be-recognized speech; and use the output result of each task layer for the to-be-recognized speech as a task processing result of the speech signal processing task corresponding to each task layer.

Optionally, the model application module 500 is further configured to determine an output result of each task layer of the speech signal processing model for the to-be-recognized speech; and use the output result of each task layer for the to-be-recognized speech to assist task processing in the speech signal processing task corresponding to each task layer.

Optionally, the model application module 500 may also be used in the apparatus shown in FIG. 13.

Figure 16:
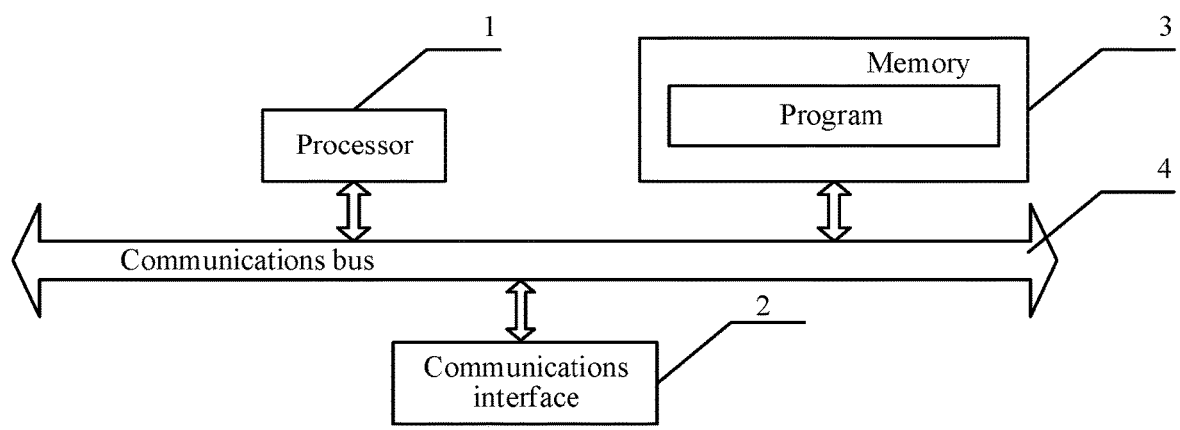
FIG. 16 illustrates a structural block diagram of an electronic device for implementing a speech signal processing model or for training a speech signal processing model.

The speech signal processing model training apparatus provided by the embodiments of the present invention may be applied to an electronic device. Optionally, a hardware structure of the electronic device may be shown in FIG. 16, and includes at least one processor 1, at least one communications interface 2, at least one memory 3, and at least one communications bus 4.

In this embodiment of the present invention, the quantity of each of the processor 1, the communications interface 2, the memory 3, and the communications bus 4 is at least one, and communication among the processor 1, the communications interface 2, and the memory 3 is implemented by using the communications bus 4. Optionally, the processor 1 may be a central processing unit (CPU) or an application-specific integrated circuit (ASIC), or may be configured as one or more integrated circuits for implementing the embodiments of the present invention. The memory 3 may include a high-speed RAM memory, or may further include a non-volatile memory, for example, at least one magnetic disk memory.

The memory stores a program, the processor invokes the program stored by the memory, and the program is configured for:

acquiring a sample speech and determining a task input feature of each speech signal processing task of the sample speech; determining a target training loss function based on a training loss function of each speech signal processing task; and using the task input feature of each speech signal processing task of the sample speech as a training input of a to-be-trained multi-task neural network, and updating parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

Optionally, the program is further configured for:

for the shared layer, updating the parameters of the shared layer based on the target training loss function by minimizing the target training loss function as the training objective; and for the task layer corresponding to any speech signal processing task, updating the parameters of the task layer of the speech signal processing task based on the training loss function of the speech signal processing task by minimizing the target training loss function as the training objective.

Optionally, the program is further configured for:

determining one or more first-class speech signal processing tasks from a plurality of speech signal processing tasks of a speech signal processing procedure;

determining a task input feature of each of the first-class speech signal processing tasks of the sample speech;

determining a first target training loss function based on a training loss function of the first-class speech signal processing tasks; and using the task input features of the first-class speech signal processing tasks of the sample speech as a training input of an initial multi-task neural network, and updating parameters of a shared layer and a task layer corresponding to each of the first-class speech signal processing tasks of the initial multi-task neural network by minimizing the first target training loss function as a training objective, until the initial multi-task neural network converges, to obtain the first multi-task neural network.

Optionally, the program is further configured for:

for any first-class speech signal processing task, multiplying the training loss function of the first-class speech signal processing task by a weight corresponding to the first-class speech signal processing task to obtain a multiplication result of the first-class speech signal processing task, so as to determine a multiplication result of each first-class speech signal processing task; and obtaining the first target training loss function by adding the multiplication result of each first-class speech signal processing task.

Optionally, the program is further configured for:

determining a basic task from the plurality of speech signal processing tasks, and determining the basic task as one of the first-class speech signal processing tasks, the basic task being a task providing an auxiliary effect for other speech signal processing tasks in the plurality of speech signal processing tasks.

Optionally, the program is further configured for:

determining, from the plurality of speech signal processing tasks, a speech signal processing task having a training complexity higher than a set complexity threshold as one of the first-class speech signal processing tasks.

Optionally, the program is further configured for:

training the initial multi-task neural network progressively based on the plurality of groups of task input features of the first-class speech signal processing tasks of the sample speech in a plurality of training stages, to obtain the first multi-task neural network, one training stage using one group of task input features of the first-class speech signal processing tasks of the sample speech as a training input, and minimizing the first target training loss function as a training objective.

Optionally, the program is further configured for:

selecting a current group of task input features corresponding to a current training stage from the plurality of groups of task input features of the first-class speech signal processing tasks of the sample speech based on the current training stage; and using the current group of task input features as a training input of the multi-task neural network trained in a previous training stage, and updating parameters of the shared layer and the task layers corresponding to the first-class speech signal processing tasks of the multi-task neural network trained in the previous training stage by minimizing the first target training loss function as a training objective, until a multi-task neural network trained based on a last group of task input features reaches convergence, to obtain the first multi-task neural network.

Optionally, the program is further configured for:

for any speech signal processing task, multiplying the training loss function of the speech signal processing task by a weight corresponding to the speech signal processing task to obtain a corresponding multiplication result of the speech signal processing task, so as to determine a corresponding multiplication result of each speech signal processing task; and obtaining the target training loss function by adding the corresponding multiplication result of each speech signal processing task.

Optionally, the program is further configured for:

updating, in the LSTM network of the to-be-trained multi-task neural network, connection parameters from an input layer to a hidden layer, connection parameters from the hidden layer to an output layer or connection parameters between the hidden layers; and updating, in the fully connected MLP network corresponding to each speech signal processing task, connection parameters from an input layer to a hidden layer or connection parameters from the hidden layer to an output layer.

Optionally, the program is further configured for:

determining an output result of each task layer of the speech signal processing model for a to-be-recognized speech;

using the output result of each task layer for the to-be-recognized speech as a task processing result of the speech signal processing task corresponding to each task layer.

Optionally, the program is further configured for:

determining an output result of each task layer of the speech signal processing model for a to-be-recognized speech;

using the output result of each task layer for the to-be-recognized speech to assist task processing in the speech signal processing task corresponding to each task layer.

The refinement function and extension function of the program may refer to the corresponding parts described above.

Further, the embodiments of the present invention further provide a storage medium, storing a program configured to be executed by a processor, the program being configured for:

acquiring a sample speech and determining a task input feature of each speech signal processing task of the sample speech; determining a target training loss function based on a training loss function of each speech signal processing task; and using the task input feature of each speech signal processing task of the sample speech as a training input of a to-be-trained multi-task neural network, and updating parameters of a shared layer and each task layer of the to-be-trained multi-task neural network by minimizing the target training loss function as a training objective, until the to-be-trained multi-task neural network converges, to obtain a speech signal processing model, the to-be-trained multi-task neural network including: the shared layer and the task layer corresponding to each speech signal processing task.

Optionally, the refinement function and extension function of the program may refer to the corresponding parts described above.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons having ordinary skill in the art may further understand that, the various function and structural unit, algorithm, and steps in h the embodiments herein can be implemented in electronic hardware, computer software, or the combination thereof. In order to illustrate the interchangeability between the hardware and the software, compositions and steps of each example have been generally described according to functions in the foregoing descriptions. Whether the functions are executed in as hardware or software depends on particular applications and design constraints of the technical solutions. Persons having ordinary skill in the art can use different modes to implement the described functions for each particular application. These mode of implementation are within the scope of the present disclosure.

In view with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms well-known in the technical field.

The above description of the disclosed embodiments enables persons having ordinary skill in the art to implement or use the present disclosure. Various modifications to these embodiments may be made without creative efforts. The general principles defined in the present disclosure may be implemented in other embodiments without departing from the core idea or scope of the present disclosure. Therefore, the present disclosure is not limited to these embodiments illustrated in the present disclosure, but covers the broadest scope consistent with the principles and novel features disclosed in the present disclosure.

What is claimed is:

1. A speech signal processing model training method, applied to an electronic device, comprising:

acquiring a sample speech and determining task input features each for one speech signal processing task among one or more speech signal processing tasks for the sample speech;

establishing a starting multi-task neural network comprising one or more task layers corresponding to the one or more speech signal processing tasks and a shared layer common to the one or more speech signal processing tasks;

determining a target training loss function based on separate training loss functions each for one speech signal processing task of the one or more speech signal processing tasks; and using the task input features of the one or more speech signal processing tasks as a training input of the starting multi-task neural network, and updating model parameters of the shared layer and the one or more task layers of the starting multi-task neural network by minimizing the target training loss function as a training objective, until the starting multi-task neural network converges, to obtain a speech signal processing model, wherein the starting multi-task neural network comprises a first multi-task neural network, the method further comprising:

determining, from the one or more speech signal processing tasks, one or more speech signal processing tasks having a training complexity higher than a preset complexity threshold as one or more first-class speech signal processing tasks, the one or more first-class speech signal processing tasks having corresponding first-class task input features and a first-class target training loss function; and using the first-class task input features of the one or more first-class speech signal processing tasks of the sample speech as a training input of an initial untrained multi-task neural network, and updating parameters of a first shared layer and first task layers corresponding to the one or more first-class speech signal processing tasks by minimizing the first-class target training loss function as a training objective, until the initial untrained multi-task neural network converges, to obtain the first multi-task neural network.

2. The speech signal processing model training method according to claim 1, wherein updating the model parameters of the shared layer and the one or more task layers of the starting multi-task neural network by minimizing the target training loss function as a training objective comprises:

for the shared layer, updating the model parameters of the shared layer based on the target training loss function by minimizing the target training loss function as the training objective; and for each of the one or more task layers corresponding to the one or more speech signal processing tasks, updating the model parameters of the one or more task layers based on the separate training loss function corresponding to the one or more speech signal processing tasks by minimizing the separate target training loss function as the training objective.

3. The speech signal processing model training method according to claim 1, further comprising:

determining the first-class task input features of the one or more first-class speech signal processing tasks of the sample speech; and determining the first-class target training loss function based on training loss functions corresponding to the one or more first-class speech signal processing tasks.

4. The speech signal processing model training method according to claim 1, wherein determining the target training loss function based on the separate training loss functions each for one speech signal processing task among the one or more speech signal processing tasks comprises:

for each of the one or more speech signal processing tasks, multiplying the corresponding separate training loss function by a corresponding weight to obtain a corresponding multiplication result for each speech signal processing task; and determining the target training loss function by adding each corresponding multiplication result of the one or more speech signal processing tasks.

5. The speech signal processing model training method according to claim 1, wherein:

the shared layer comprises a long short term memory (LSTM) network, and the one or more task layers corresponding to the one or more speech signal processing tasks each comprises a fully connected multi-layer perceptron (MLP) network; and updating the model parameters of the shared layer and the one or more task layers of the starting multi-task neural network comprises:

updating, in the LSTM network, connection parameters from an input layer to a hidden layer, connection parameters from the hidden layer to an output layer, or connection parameters between the hidden layers of the LSTM network; and updating, in the each fully connected MLP network, connection parameters from an input layer to a hidden layer or connection parameters from the hidden layer to an output layer of the each fully connected MLP network.

6. An electronic device, comprising:

at least one memory and at least one processor; the memory storing a program, the processor invoking the program stored by the memory, and the program being configured for:

acquiring a sample speech and determining task input features each for one speech signal processing task among one or more speech signal processing tasks for the sample speech;

establishing a starting multi-task neural network model comprising one or more task layers corresponding to the one or more speech signal processing tasks and a shared layer common to the one or more speech signal processing tasks;

determining a target training loss function based on separate training loss functions each for one speech signal processing task among the one or more speech signal processing tasks;

using the task input features of the one or more speech signal processing tasks as a training input of the starting multi-task neural network, and updating model parameters of the shared layer and the one or more task layers of the starting multi-task neural network by minimizing the target training loss function as a training objective, until the starting multi-task neural network converges, to obtain a speech signal processing model;

determining, from the one or more speech signal processing tasks, one or more speech signal processing tasks having a training complexity higher than a preset complexity threshold as one or more first-class speech signal processing tasks, the one or more first-class speech signal processing tasks having corresponding first-class task input features and a first-class target training loss function; and using the first-class task input features of the one or more first-class speech signal processing tasks of the sample speech as a training input of an initial untrained multi-task neural network, and updating parameters of a first shared layer and first task layers corresponding to the one or more first-class speech signal processing tasks by minimizing the first-class target training loss function as a training objective, until the initial untrained multi-task neural network converges, to obtain the starting multi-task neural network.

7. The electronic device according to claim 6, wherein the program is further configured for:

for the shared layer, updating the model parameters of the shared layer based on the target training loss function by minimizing the target training loss function as the training objective; and for each of the one or more task layers corresponding to the one or more speech signal processing tasks, updating the model parameters of the one or more task layers based on the separate training loss function corresponding to the one or more speech signal processing tasks by minimizing the separate target training loss function as the training objective.

8. The electronic device according to claim 6, wherein the program is further configured for:

determining the first-class task input features of the one or more first-class speech signal processing tasks of the sample speech; and determining the first-class target training loss function based on training loss functions corresponding to the one or more first-class speech signal processing tasks.

9. The electronic device according to claim 8, wherein the program is further configured for:
for each of the one or more first-class speech signal processing tasks, multiplying the corresponding training loss function of the one or more first-class speech signal processing tasks by a corresponding weight to obtain a multiplication result for each of the one or more first-class speech signal processing tasks; and
determining the first-class target training loss function by adding the multiplication result of each of the one or more first-class speech signal processing tasks.

10. The electronic device according to claim 8, wherein the program is further configured for:
training the initial untrained multi-task neural network progressively based on a plurality of groups of task input features of the one or more first-class speech signal processing tasks in a plurality of training stages, to obtain the starting multi-task neural network,
wherein each of the plurality of training stages using one of the plurality of groups of task input features of the one or more first-class speech signal processing tasks of the sample speech as a training input, and minimizing the first-class target training loss function as a training objective.

11. The electronic device according to claim 10, wherein the program is further configured for:
selecting a current group of task input features corresponding to a current training stage from the plurality of groups of task input features of the first-class speech signal processing task of the sample speech; and
using the current group of task input features as a training input of an intermediate multi-task neural network trained in a previous training stage, and updating parameters of the first shared layer and the first task layers corresponding to the one or more first-class speech signal processing tasks of the intermediate multi-task neural network trained in the previous training stage by minimizing the first-class target training loss function as a training objective, until the intermediate multi-task neural network trained in the previous training stage reaches convergence in the current training stage.

12. The electronic device according to claim 6, wherein the program is further configured for:
for each of the one or more speech signal processing tasks, multiplying the corresponding separate training loss function by a corresponding weight to obtain a corresponding multiplication result of for each speech signal processing task; and
determining the target training loss function by adding each corresponding multiplication result of the one or more speech signal processing tasks.

13. The electronic device according to claim 6, wherein:
the shared layer comprises a long short term memory (LSTM) network, and the one or more task layers corresponding to the one or more speech signal processing tasks each comprises a fully connected multi-layer perceptron (MLP) network; and
the program is further configured for:
updating, in the LSTM network, connection parameters from an input layer to a hidden layer, connection parameters from the hidden layer to an output layer, or connection parameters between the hidden layers of the LSTM network; and
updating, in the each fully connected MLP network, connection parameters from an input layer to a hidden layer or connection parameters from the hidden layer to an output layer of the each fully connected MLP network.

14. The electronic device according to claim 6, wherein the program is further configured for:
determining an output result of each of the one or more task layers of the speech signal processing model for a to-be-recognized speech; and
using the output result of each of the one or more task layers for the to-be-recognized speech as a task processing result corresponding to the each of the speech signal processing tasks.

15. The electronic device according to claim 6, wherein the program is further configured for:
determining an output result of each of the one or more task layers of the speech signal processing model for a to-be-recognized speech; and
using the output result of each of the one or more task layers for the to-be-recognized speech to assist further processing of the to-be-recognized speech.

16. A non-transitory storage medium, storing a program configured to be executed by a processor, the program being configured for:
acquiring a sample speech and determining task input features each for one speech signal processing task among one or more speech signal processing tasks for the sample speech;
establishing a starting multi-task neural network comprising one or more task layers corresponding to the one or more speech signal processing tasks and a shared layer common to the one or more speech signal processing tasks;
determining a target training loss function based on separate training loss functions each for one speech signal processing task among the one or more speech signal processing tasks;
using the task input features of the one or more speech signal processing tasks as a training input of the starting multi-task neural network, and updating model parameters of the shared layer and the one or more task layers of the starting multi-task neural network by minimizing the target training loss function as a training objective, until the starting multi-task neural network converges, to obtain a speech signal processing model;
determining, from the one or more speech signal processing tasks, one or more speech signal processing tasks having a training complexity higher than a preset complexity threshold as one or more first-class speech signal processing tasks, the one or more first-class speech signal processing tasks having corresponding first-class task input features and a first-class target training loss function; and
using the first-class task input features of the one or more first-class speech signal processing tasks of the sample speech as a training input of an initial untrained multi-task neural network, and updating parameters of a first shared layer and first task layers corresponding to the one or more first-class speech signal processing tasks by minimizing the first-class target training loss function as a training objective, until the initial untrained multi-task neural network converges, to obtain the starting multi-task neural network.

17. The non-transitory storage medium of claim 16, wherein the program is further configured for:

for the shared layer, updating the model parameters of the shared layer based on the target training loss function by minimizing the target training loss function as the training objective; and for each of the one or more task layers corresponding to the one or more speech signal processing tasks, updating the model parameters of the one or more task layers based on the separate training loss function corresponding to the one or more speech signal processing tasks by minimizing the separate target training loss function as the training objective.

18. The non-transitory storage medium of claim 16, wherein the program is further configured for:

determining the first-class task input features of the one or more first-class speech signal processing tasks of the sample speech; and determining the first-class target training loss function based on training loss functions corresponding to the one or more first-class speech signal processing tasks.

19. The non-transitory storage medium of claim 18, wherein the program is further configured for:

for each of the one or more first-class speech signal processing tasks, multiplying the corresponding training loss function of the one or more first-class speech signal processing tasks by a corresponding weight to obtain a multiplication result for each of the one or more first-class speech signal processing tasks; and determining the first-class target training loss function by adding the multiplication result of each of the one or more first-class speech signal processing tasks.

20. The non-transitory storage medium of claim 18, wherein the program is further configured for:

training the initial untrained multi-task neural network progressively based on a plurality of groups of task input features of the one or more first-class speech signal processing tasks in a plurality of training stages, to obtain the starting multi-task neural network, wherein each of the plurality of training stages using one of the plurality of groups of task input features of the one or more first-class speech signal processing tasks of the sample speech as a training input, and minimizing the first-class target training loss function as a training objective.

* * * * *